United States Patent
Alanqar et al.

(10) Patent No.: US 11,454,940 B2
(45) Date of Patent: Sep. 27, 2022

(54) BUILDING CONTROL SYSTEM WITH HEAT LOAD ESTIMATION USING DETERMINISTIC AND STOCHASTIC MODELS

(71) Applicant: Johnson Controls Technology Company, Auburn Hills, MI (US)

(72) Inventors: Anas W. I. Alanqar, Milwaukee, WI (US); Matthew J. Ellis, Milwaukee, WI (US); Michael J. Wenzel, Grafton, WI (US); Mohammad N. ElBsat, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 52 days.

(21) Appl. No.: 16/418,715

(22) Filed: May 21, 2019

(65) Prior Publication Data
US 2020/0371482 A1  Nov. 26, 2020

(51) Int. Cl.
*G05B 13/04* (2006.01)
*G06N 20/00* (2019.01)

(52) U.S. Cl.
CPC ......... *G05B 13/048* (2013.01); *G05B 13/042* (2013.01); *G06N 20/00* (2019.01)

(58) Field of Classification Search
CPC ............... G05B 13/048; G05B 13/042; G05B 2219/163; G05B 2219/2642; G05B 15/02; G06N 20/00; F24F 11/46
See application file for complete search history.

(56) References Cited

U.S. PATENT DOCUMENTS

| | | | |
|---|---|---|---|
| 4,707,324 | A | 11/1987 | Storrick |
| 6,405,554 | B1 | 6/2002 | Kawakatu et al. |
| 6,468,814 | B1 | 10/2002 | Frees et al. |
| 8,200,345 | B2 | 6/2012 | Li et al. |

(Continued)

FOREIGN PATENT DOCUMENTS

JP  2012-141110 A  7/2012

OTHER PUBLICATIONS

U.S. Appl. No. 15/900,459, filed Feb. 20, 2017, Johnson Controls Technology Company.

(Continued)

*Primary Examiner* — Tejal Gami
(74) *Attorney, Agent, or Firm* — Foley & Lardner LLP

(57) ABSTRACT

An environmental control system for a building including building equipment operable to affect a variable state or condition of the building. The system includes a controller including a processing circuit. The processing circuit can obtain training data relating to operation of the building equipment and can perform a system identification process to identify parameters of a system model using the training data. The processing circuit can augment the system model with a disturbance model and estimate values of a historical heat disturbance in the training data based on the augmented system model. The processing circuit can train one or more heat disturbance models based on the training data and the estimated values. The processing circuit can predict a heat disturbance using the augmented system model along with the one or more heat disturbance models and can control the building equipment based on the predicted heat disturbance.

22 Claims, 19 Drawing Sheets

(56) References Cited

U.S. PATENT DOCUMENTS

| | | |
|---|---|---|
| 8,694,132 B2 | 4/2014 | Li et al. |
| 8,903,554 B2 | 12/2014 | Stagner |
| 9,235,657 B1 | 1/2016 | Wenzel et al. |
| 9,429,923 B2 | 8/2016 | Ward et al. |
| 10,767,886 B2 | 9/2020 | Alanqar et al. |
| 2004/0168450 A1 | 9/2004 | Nishiwaki |
| 2004/0248589 A1 | 12/2004 | Gwon et al. |
| 2011/0214020 A1 | 9/2011 | Caspi et al. |
| 2013/0338935 A1 | 12/2013 | Watanabe et al. |
| 2014/0260379 A1 | 9/2014 | Marte |
| 2014/0331700 A1 | 11/2014 | Madsen et al. |
| 2015/0274346 A1 | 10/2015 | Buckby et al. |
| 2015/0316907 A1 | 11/2015 | ElBsat et al. |
| 2016/0098022 A1* | 4/2016 | Wenzel .............. G05B 13/0265 700/275 |
| 2016/0305678 A1 | 10/2016 | Pavlovski et al. |
| 2018/0285800 A1 | 10/2018 | Wenzel et al. |
| 2018/0313557 A1* | 11/2018 | Turney .................... F24F 11/64 |
| 2019/0257544 A1 | 8/2019 | Alanqar et al. |

OTHER PUBLICATIONS

U.S. Appl. No. 16/240,028, filed Jan. 4, 2019, Johnson Controls Technology Company.

Batterman, Stuart. Review and Extension of CO2-Based Methods to Determine Ventilation Rates with Application to School Classrooms. International Journal of Environmental Research and Public Health. Feb. 4, 2017. 22 Pages.

Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.

Kang et al., Novel Modeling and Control Strategies for a HVAC System Including Carbon Dioxide Control. Jun. 2, 2014. 19 Pages.

Lampinen, Markku J. Thermodynamics of Humid Air. Sep. 2015. 39 Pages.

Luo, Xiaoyan. Maximizing Thermal Comfort and International Design. Loughborough University. Jan. 18, 2019. 4 Pages.

Sama Aghniaey et al., The Assumption of Equidistance in the Seven-Point Thermal Sensation Scale and a Comparison between Categorical and Continuous Metrics. University of Georgia College of Engineering. Jan. 18, 2019. 4 Pages.

Sudhakaran, Saurabh; Shaurette Mark. Temperature, Relative Humidity, and CarbonDioxide Modulation in a Near-Zero Energy Efficient Retrofit House. Purdue University. 2016, 11 Pages.

Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.

U.S. Appl. No. 16/240,028, filed Jan. 4, 2019, Alanqar et al.

U.S. Appl. No. 16/418,715, filed May 21, 2019, Alanqar et al.

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsei, and Greta M Ljung. Time Series Analysis: Forecasting and Control. John Wiley & Sons, 2015, chapters 13-15. 82 pages.

George EP Box, Gwilym M Jenkins, Gregory C Reinsei, and Greta M Ljung. Time Series Analysis: Forecasting and Control. John Wiley & Sons, 2015, chapters 4-7 and 13-15. 183 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal.Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Ljung, L. (1999). System Identification: Theory for the User, 2nd ed. (Prentice Hall PTR, Upper Saddle River).

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 10 pages. 2018.

Pannocchia, G. & Rawlings, J.B. (2003) Disturbance Models for Offset-Free Model-Predictive Control. AIChE Journal, 49,426-437.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3)796-803, 2012.7 pages.

\* cited by examiner

BUILDING CONTROL SYSTEM WITH HEAT LOAD ESTIMATION USING DETERMINISTIC AND STOCHASTIC MODELS

BACKGROUND

The present disclosure relates generally to control systems for buildings. The present disclosure relates more particularly to system identification for controlling building equipment.

System identification refers to the determination of a model that describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model.

SUMMARY

One implementation of the present disclosure is an environmental control system for a building, according to some embodiments. The system includes building equipment operable to affect a variable state or condition of the building, according to some embodiments. The system includes a controller, according to some embodiments. The controller includes a processing circuit, according to some embodiments. The processing circuit is configured to obtain training data relating to operation of the building equipment, according to some embodiments. The processing circuit is configured to perform a system identification process to identify parameters of a system model using the training data, according to some embodiments. The processing circuit is configured to augment the system model with a disturbance model, according to some embodiments. The processing circuit is configured to estimate values of a historical heat disturbance in the training data based on the augmented system model, according to some embodiments. The processing circuit is configured to train one or more heat disturbance models based on the training data and the estimated values of the historical heat disturbance, according to some embodiments. The processing circuit is configured to predict a heat disturbance using the augmented system model along with the one or more heat disturbance models, according to some embodiments. The processing circuit is configured to control the building equipment based on the predicted heat disturbance, according to some embodiments.

In some embodiments, training the one or more heat disturbance models includes training a deterministic heat disturbance model based on the training data and the estimated values of the historical heat disturbance. Training the one or more heat disturbance model includes training a stochastic heat disturbance model based on the training data and the estimated values of the historical heat disturbance, according to some embodiments. The one or more heat disturbance models include the deterministic heat disturbance model and the stochastic heat disturbance model, according to some embodiments.

In some embodiments, the disturbance model is an oscillator function with a frequency of one day.

In some embodiments, the disturbance model is a parameterized model for determining the heat disturbance.

In some embodiments, predicting the heat disturbance includes estimating a deterministic heat disturbance for a future time step. Predicting the heat disturbance includes predicting a stochastic heat disturbance for the future time step, according to some embodiments. Predicting the heat disturbance includes predicting a forecasted heat disturbance for one or more subsequent time steps based on the stochastic heat disturbance for the future time step and the deterministic heat disturbance for the future time step, according to some embodiments.

In some embodiments, predicting the stochastic heat disturbance for the future time step includes performing an online state estimation. Predicting the stochastic heat disturbance for the future time step includes calculating a current residual based on the online state estimation and an estimated deterministic heat disturbance for a current time step, according to some embodiments. Predicting the stochastic heat disturbance for the future time step includes predicting the stochastic heat disturbance for the future time step based on a trained autoregressive model and the current residual, according to some embodiments.

In some embodiments, predicting the heat disturbance includes applying one or more Kalman gain parameters to the augmented system model. Predicting the heat disturbance includes performing a system identification process to determine values of the one or more Kalman gain parameters, according to some embodiments. Predicting the heat disturbance includes estimating a current stochastic heat disturbance based on the augmented system model with the one or more Kalman gain parameters and one or more current environmental conditions, according to some embodiments.

Another implementation of the present disclosure is a method for operating building equipment in a building, according to some embodiments. The method includes obtaining training data relating to operation of the building equipment, according to some embodiments. The method includes performing a system identification process to identify parameters of a system model using the training data, according to some embodiments. The method includes augmenting the system model with a disturbance model, according to some embodiments. The method includes estimating values of a historical heat disturbance in the training data based on the augmented system model, according to some embodiments. The method includes training one or more heat disturbance models based on the training data and the estimated values of the historical heat disturbance, according to some embodiments. The method includes predicting a heat disturbance using the augmented system model along with the one or more heat disturbance models, according to some embodiments. The method includes controlling the building equipment based on the predicted heat disturbance, according to some embodiments.

In some embodiments, the disturbance model is a second order model with known parameters.

In some embodiments, the disturbance model is an oscillator function with a frequency of one day.

In some embodiments, the disturbance model is a parameterized model for determining the heat disturbance.

In some embodiments, predicting the heat disturbance includes estimating a deterministic heat disturbance for a future time step. Predicting the heat disturbance includes predicting a stochastic heat disturbance for the future time step, according to some embodiments. Predicting the heat disturbance includes predicting a forecasted heat disturbance for one or more subsequent time steps based on the stochastic heat disturbance for the future time step and the deterministic heat disturbance for the future time step, according to some embodiments.

In some embodiments, predicting the stochastic heat disturbance for the future time step includes performing an online state estimation. Predicting the stochastic heat disturbance for the future time step includes calculating a current residual based on the online state estimation and an estimated deterministic heat disturbance for a current time step, according to some embodiments. Predicting the stochastic heat disturbance for the future time step includes predicting the stochastic heat disturbance for the future time step based on a trained autoregressive model and the current residual, according to some embodiments In some embodiments, predicting the heat disturbance includes applying one or more Kalman gain parameters to the augmented system model. Predicting the heat disturbance includes performing a system identification process to determine values of the one or more Kalman gain parameters, according to some embodiments. Predicting the heat disturbance includes estimating a current stochastic heat disturbance based on the augmented system model with the one or more Kalman gain parameters and one or more current environmental conditions, according to some embodiments.

Another implementation of the present disclosure is one or more non-transitory computer-readable media, according to some embodiments. The one or more non-transitory computer-readable media include instructions that, when executed by one or more processors, cause the one or more processors to perform operations, according to some embodiments. The operations include obtaining training data relating to operation of building equipment, according to some embodiments. The operations include performing a system identification process to identify parameters of a system model using the training data, according to some embodiments. The operations include augmenting the system model with a disturbance model, according to some embodiments. The operations include estimating values of a historical heat disturbance in the training data based on the augmented system model, according to some embodiments. The operations include training one or more heat disturbance models based on the training data and the estimated values of the historical heat disturbance, according to some embodiments. The operations include predicting a heat disturbance using the augmented system model along with the one or more heat disturbance models, according to some embodiments. The operations include controlling the building equipment based on the predicted heat disturbance, according to some embodiments.

In some embodiments, the disturbance model is a second order model with known parameters.

In some embodiments, the disturbance model is an oscillator function with a frequency of one day.

In some embodiments, the disturbance model is a parameterized model for determining the heat disturbance.

In some embodiments, predicting the heat disturbance includes estimating a deterministic heat disturbance for a future time step. Predicting the heat disturbance includes predicting a stochastic heat disturbance for the future time step, according to some embodiments. Predicting the heat disturbance includes predicting a forecasted heat disturbance for one or more subsequent time steps based on the stochastic heat disturbance for the future time step and the deterministic heat disturbance for the future time step, according to some embodiments.

In some embodiments, predicting the heat disturbance includes applying one or more Kalman gain parameters to the augmented system model. Predicting the heat disturbance includes performing a system identification process to determine values of the one or more Kalman gain parameters, according to some embodiments. Predicting the heat disturbance includes estimating a current stochastic heat disturbance based on the augmented system model with the one or more Kalman gain parameters and one or more current environmental conditions, according to some embodiments.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for using system identification to estimate heat disturbances including deterministic and stochastic pieces are shown and described. The systems and method described herein provide improved system models and therefore improved estimations of heat disturbance to more accurately heat/cool a building while optimizing costs related to said heating/cooling.

A deterministic piece of heat disturbance can describe a portion of a total heat disturbance that can be determined based on parameter values and initial conditions of a heat disturbance estimation. A stochastic piece of heat disturbance can describe some inherent randomness in the heat disturbance. Estimating the stochastic piece can be quite difficult, but may be critical for a control system to generate accurate decisions. To estimate a total heat disturbance, a disturbance model can be identified and used to estimate the deterministic piece. To estimate the stochastic piece, an autogressive model can be trained to predict heat disturbance residuals and the stochastic piece can be estimated using the autoregressive model and a current residual. The deterministic piece and the stochastic piece can be combined to estimate the total heat disturbance for use in control processes (e.g., model predictive control). In some embodiments, the deterministic piece is used in conjunction with a model identified through system identification for the control processes. These and other features of the systems and methods are described in detail below.

Building HVAC Systems

Figure 1:
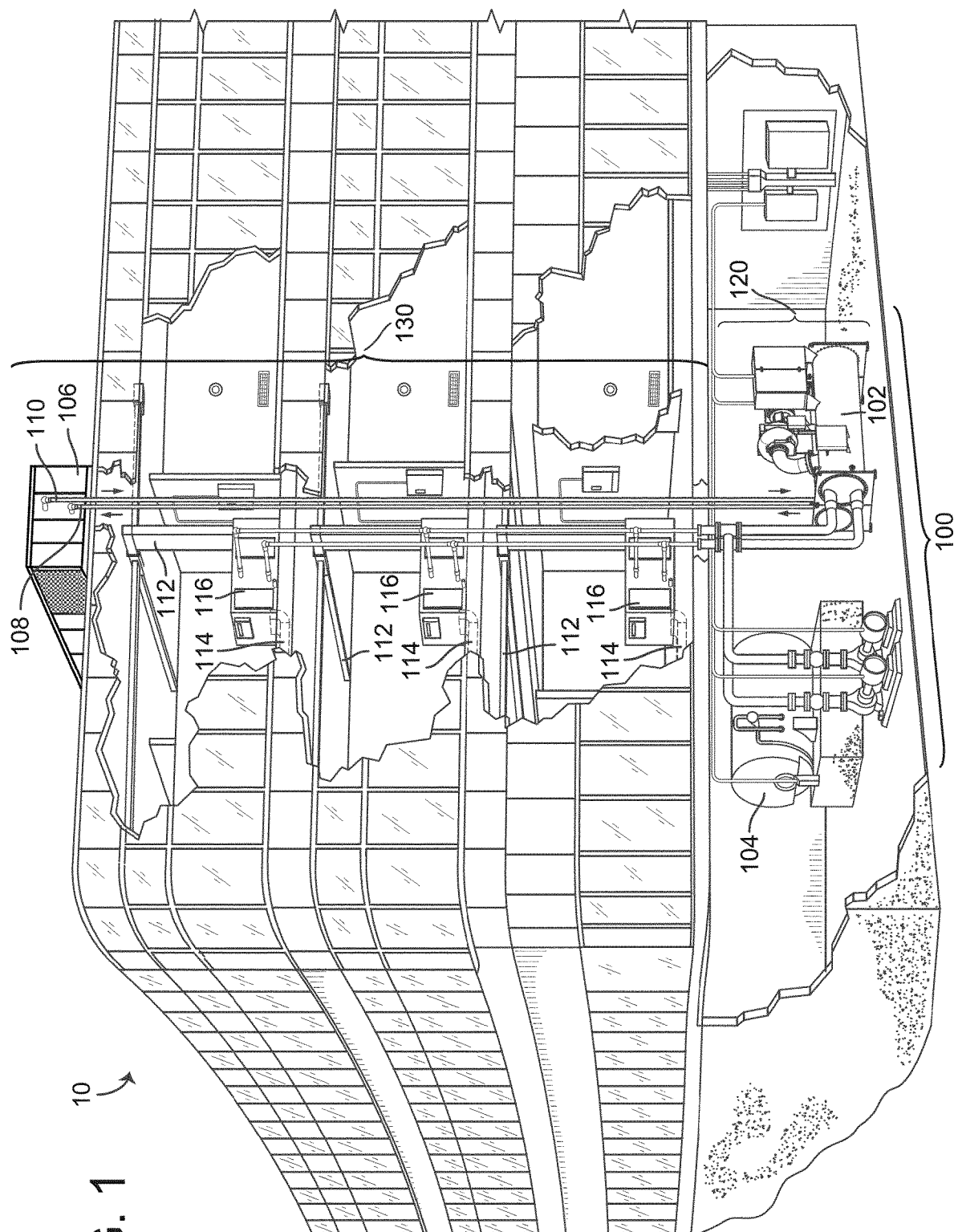
FIG. 1 is a drawing of a building equipped with a HVAC system, according to some embodiments.

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
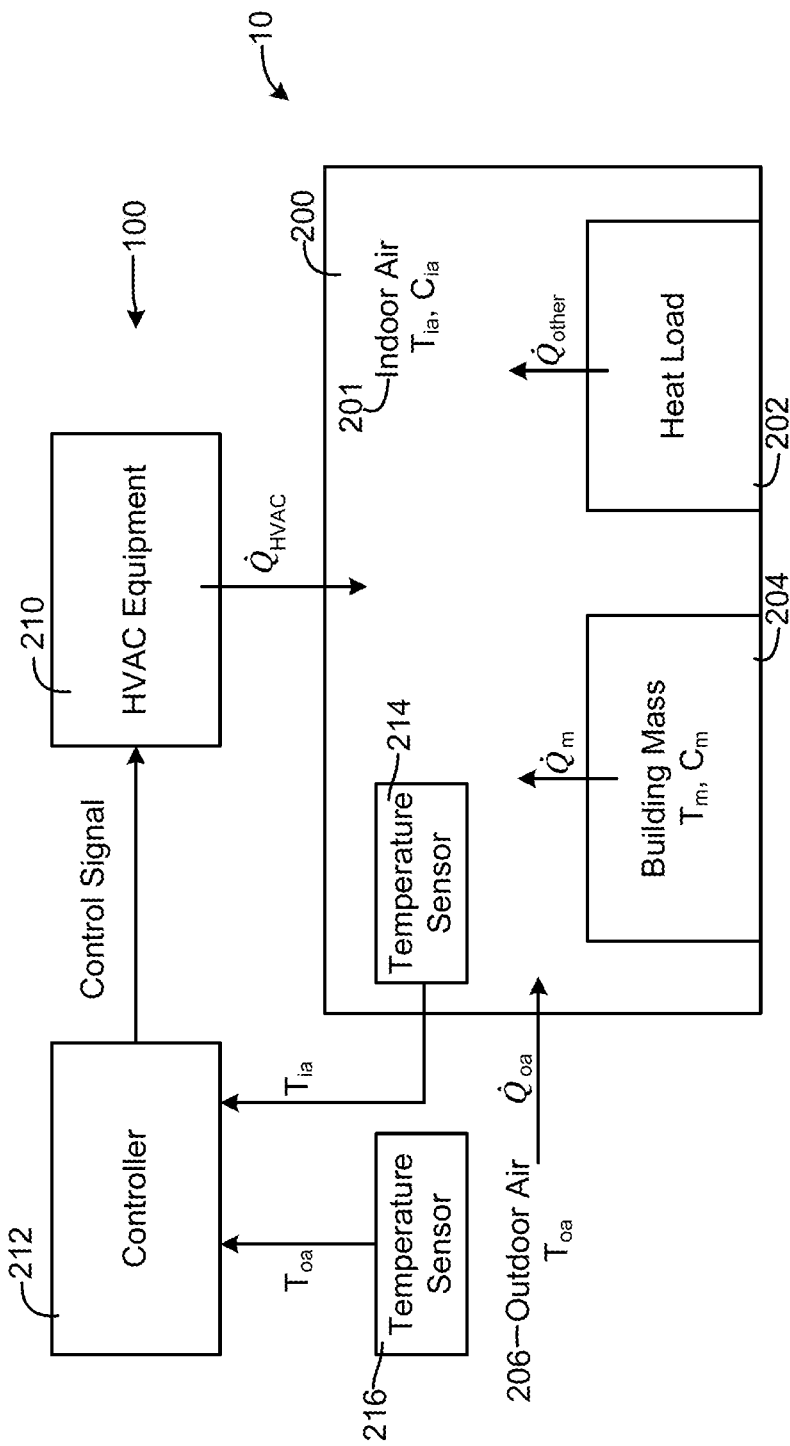
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \qquad \text{(Eq. A)}$$

$$\varepsilon_{sp} = T_{sp,j} - T_{ia} \qquad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
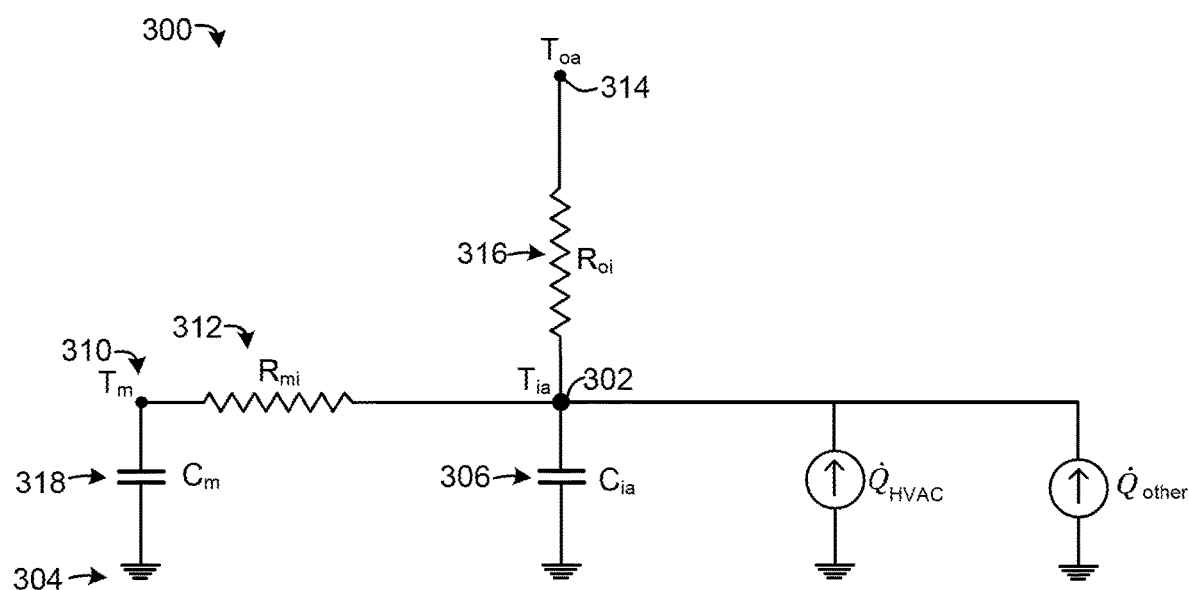
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \qquad \text{(Eq. C)}$$

$$C_m\dot{T}_m = \frac{1}{R_{mi}}(T_{ia} - T_m) \qquad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia} \dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} + \begin{bmatrix} -\frac{K_{p,j}}{C_{i,a}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other};$$ (Eq. E)

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix};$$ (Eq. F)

where I represents the integral term $\int_0^t \varepsilon_{sp}(s)\, ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t);$$ (Eq. G)

$$y(t) = C_c(\theta)x(t) + D_c(\theta)u(t);$$ (Eq. H)

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix}, \quad D_c(\theta) = \begin{bmatrix} 0 & 0 \\ \theta_4 & 0 \end{bmatrix};$$

$$\theta_1 = \frac{1}{C_{ia}R_{oi}}; \quad \theta_2 = \frac{1}{C_{ia}R_{mi}}; \quad \theta_3 = \frac{1}{C_{ia}};$$

$$\theta_4 = K_p; \quad \theta_5 = \frac{1}{\tau}; \quad \theta_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix}; \quad x(t) = \begin{bmatrix} T_{ia} \\ T_m \\ I \end{bmatrix}; \quad u(t) = \begin{bmatrix} T_{sp,j} \\ T_{oa} \end{bmatrix}.$$

As described in detail below, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{pj}$, $K_{ij}$). The disturbance state d is then introduced into the model and an Kalman estimator gain is added, such that in the second step the controller 212 identifies the Kalman gain parameters K. In some embodiments, the temperature setpoint $T_{sp}$ is not used as a system input, rather, $\dot{Q}_{HVAC}$ is used as a direct input for controller 212 in generating a control signal for the HVAC equipment 210.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
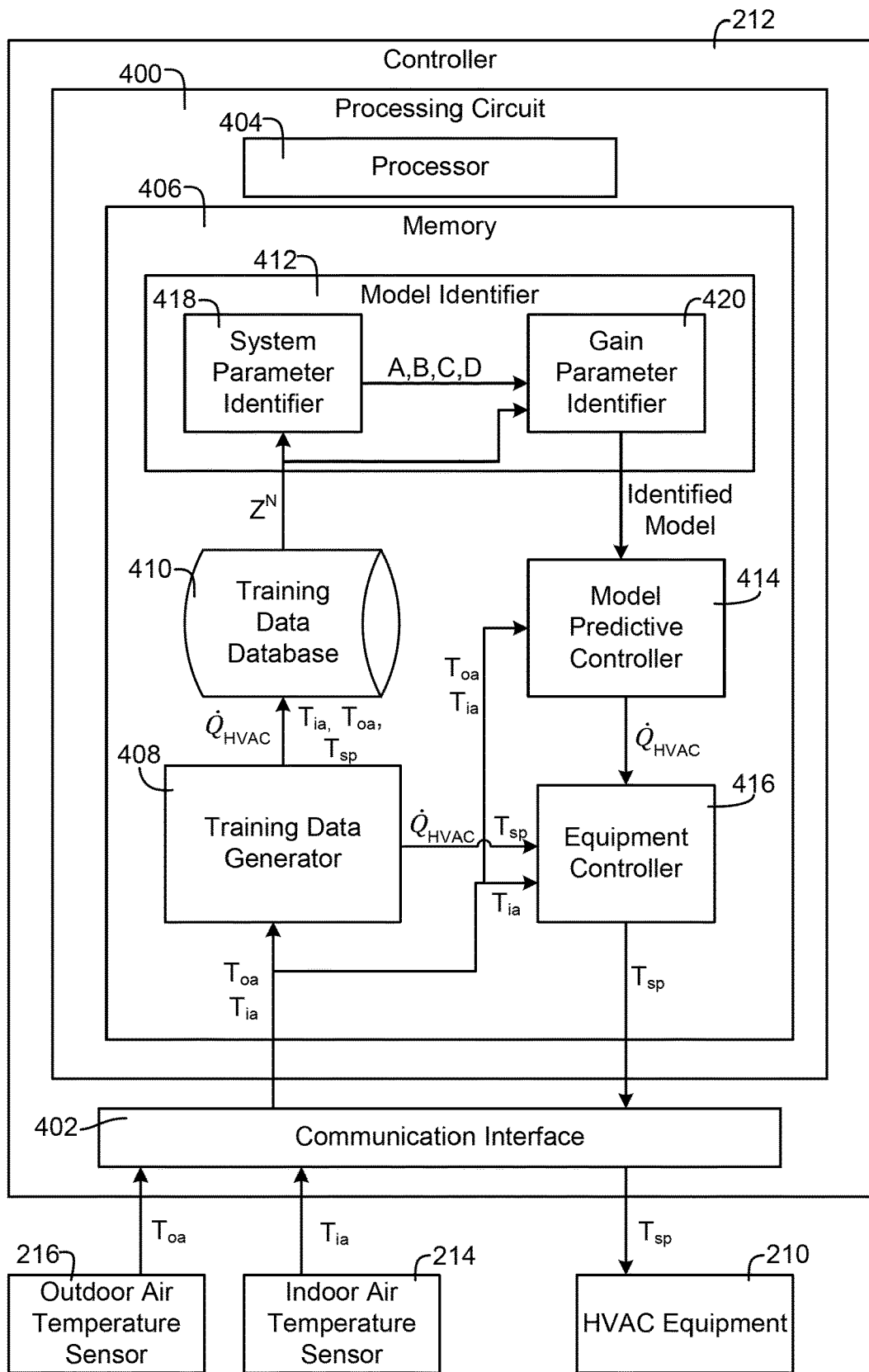
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller 416 receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. In some embodiments, the training data generator 408 provides various $\dot{Q}_{HVAC}$ values to the equipment controller 416 for a number N of time steps k, and receives the measured output response of the indoor air temperature $T_{ia}$ at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.). In some embodiments, the training data generator 408 provides various $T_{sp}$ values to the equipment controller 416 instead of the various values of $\dot{Q}_{HVAC}$.

If the equipment controller 416 receives the various $\dot{Q}_{HVAC}$ values, various control inputs $T_{sp}$ can be generated in response. The temperature setpoint $T_{sp}$ for each time step k is provided to the HVAC equipment 210, which operates accordingly to heat or cool the zone 200 (i.e., to influence $T_{ia}$). In some embodiments, the temperature setpoints $T_{sp}$ are used by the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, . . . , N, or, more specifically, $T_{sp}(k)$, $T_{oa}(k)$, $T_{ia}(k)$, and $\dot{Q}_{HVAC}(k)$, for k, k=0, . . . , N. This data is grouped together in the training data database 410 in a set of training data $Z^N$. In the notation of Eq. G and Eq. H, $Z^N$=[y(1), u(1), y(2), u(2), . . . , y(N), u(N)].

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
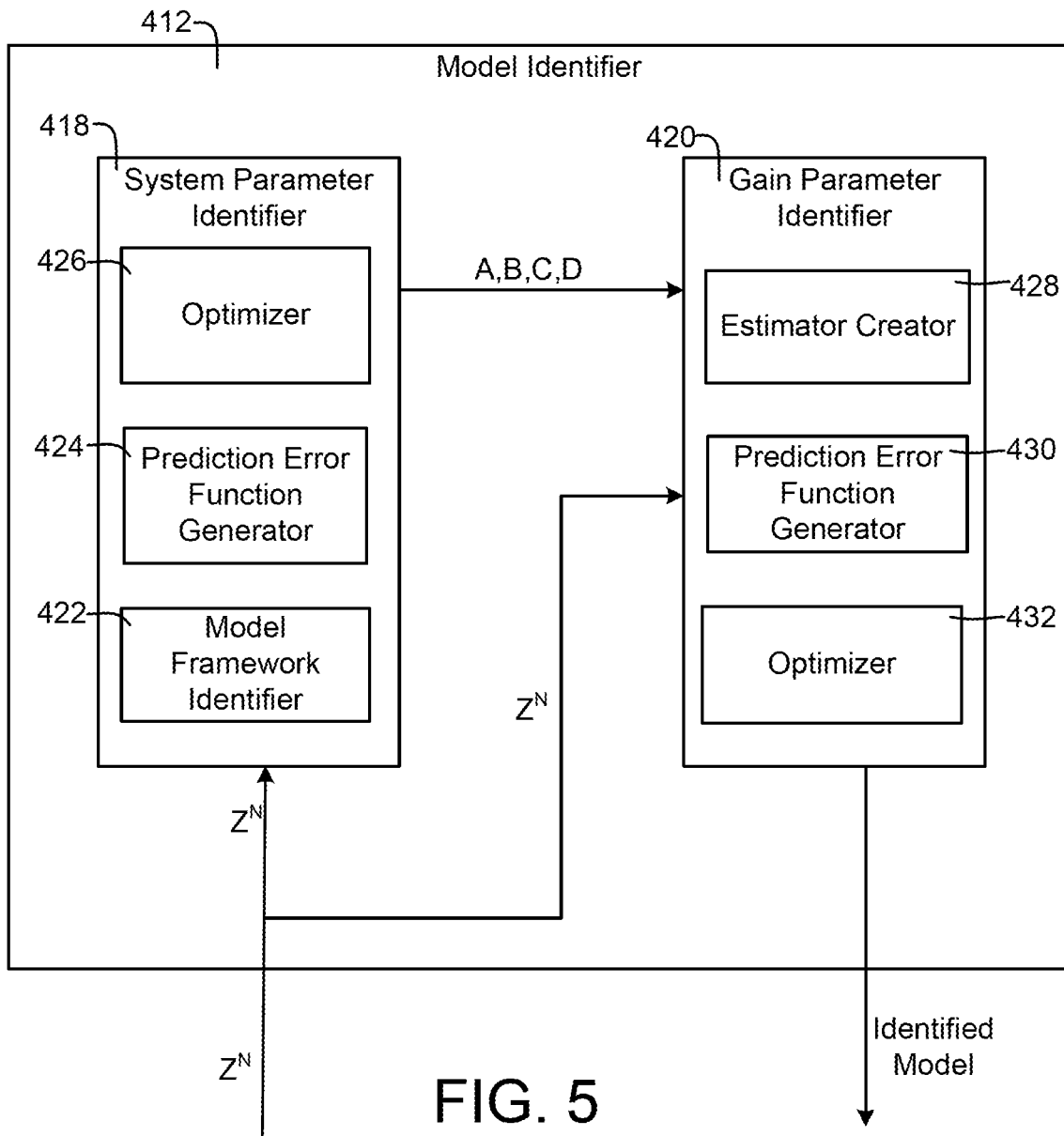
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta = \{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t) = A_c(\theta) x(t) + B_c(\theta) u(t); \quad \text{(Eq. G)}$$

$$y(t) = C_c(\theta) x(t) + D_c(\theta) u(t); \quad \text{(Eq. H)}$$

The model framework identifier 422 thereby determines that the system parameter identifier 418 has the goal of determining a parameter vector $\hat{\theta}_N$ from the set of $\theta \in D_\mathcal{M} \subset \mathbb{R}^d$, where $D_\mathcal{M}$ is the set of admissible model parameter values. The resulting possible models are given by the set: $M = \{\mathcal{M}(\theta), \theta \in D_\mathcal{M}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, . . ., N) into the notation of Eq. G-H as input/output data $Z^N$ = [y(1), u(1), y(2), u(2), . . . , y(N), u(N)].

The prediction error function generator 424 receives the model framework $M = \{\mathcal{M}(\theta), \theta \in D_\mathcal{M}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N = \hat{\theta}_N(Z^N) = \arg\min_{\theta \in D_\mathcal{M}} V_N(\theta, Z^N).$$

The prediction error function generator 424 use one or more of several possible prediction error approaches to generate a prediction performance function $V_N(\theta, Z^N)$. In the embodiment shown, the prediction error function generator applies a simulation approach. In the simulation approach, the prediction error function generator 424 uses the model $\mathcal{M}(\theta)$, the input trajectory [u(1),u(2), . . . ,u(N)], and an initial state x(0) to produce predicted outputs in terms of $\theta$. That is, the prediction error function generator 424 predicts:

$$[\hat{y}(1|0, \theta), \hat{y}(2|0, \theta) \ldots \hat{y}(k|0, \theta) \ldots, \hat{y}(N|0, \theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta) := y(k) - \hat{y}(k|0, \theta)$. The prediction error function generator 424 then squares the two-norm of each prediction error $\varepsilon(k, \theta)$ and sums the results to determine the prediction performance function, which can be written as:

$$V_N(\theta, Z^N) = \Sigma_{k=1}^{N} \|y(k) - \hat{y}(k|0, \theta)\|_2^2 \quad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of $\theta$. That is, in the one-step ahead prediction error method, the prediction error function generator 424 generates one-step ahead predictions $\hat{y}(k|k-1, \theta)$, which denotes the predicted output at time step k given the past input-output sequence $Z^{k-1}$ and using parameters $\theta$. The one-step ahead prediction $\hat{y}(k|k-1, \theta)$ is then compared to the measured output y(k) by the prediction error function generator 424 to determine the prediction error at k, defined as $\varepsilon(k, \theta) := y(k) - \hat{y}(k|k-1, \theta)$. The prediction error function generator 424 then squares the two-norm of the prediction errors for each k and sums the results, generating a prediction performance function that can be expressed in a condensed form as:

$$V_N(\theta, Z^N) = \frac{1}{N} \sum_{k=1}^{N} \|y(k) - \hat{y}(k|k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\hat{\theta}_N$. More specifically, the optimizer 426 finds the minimum value of the prediction error function $V_N(\theta, Z^N)$ as $\theta$ is varied throughout the allowable values of $\theta \in D_\mathcal{M}$. That is, the optimizer 426 determines $\hat{\theta}_N$ based on:

$$\hat{\theta}_N = \hat{\theta}_N(Z^N) = \arg\min_{\theta \in D_\mathcal{M}} V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix}\begin{bmatrix} x(t) \\ d(t) \end{bmatrix} + \begin{bmatrix} B_c \\ 0 \end{bmatrix}u(t);$$

$$y(t) = \begin{bmatrix} C_c & C_d \end{bmatrix}\begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{c_{ia}} \text{ and } C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1|t) \\ \hat{d}(t+1|t) \end{bmatrix} = \begin{bmatrix} A_{dis} & B_{d_{dis}} \\ 0 & I \end{bmatrix}\begin{bmatrix} \hat{x}(t|t-1) \\ \hat{d}(t|t-1) \end{bmatrix} + \begin{bmatrix} B_{dis} \\ 0 \end{bmatrix}u(t) + \underbrace{\begin{bmatrix} K_x(\phi) \\ K_d(\phi) \end{bmatrix}}_{=:K(\phi)}(y(t) - \hat{y}(t|t-1));$$ (Eq. K)

$$\hat{y}(t|t-1) = \begin{bmatrix} C_{dis} & 0 \end{bmatrix}\begin{bmatrix} \hat{x}(t|t-1) \\ \hat{d}(t|t-1) \end{bmatrix} + D_{dis}u(t).$$ (Eq. L)

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = \begin{bmatrix} \phi_7 & \phi_8 \end{bmatrix}.$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
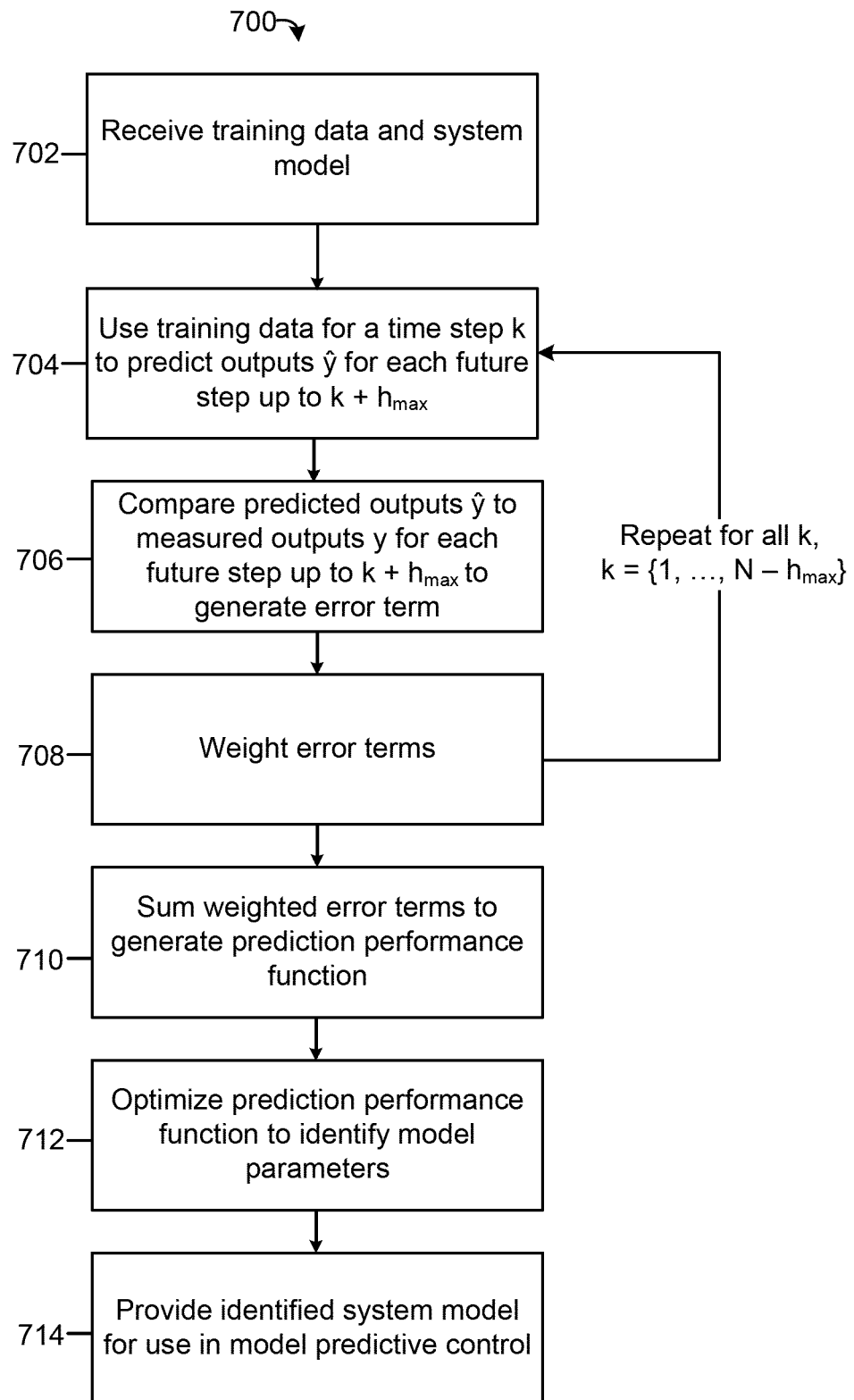
FIG. 7 is a flowchart of a multi-step ahead prediction error method for use in system identification, according to some embodiments.
Figure 8:
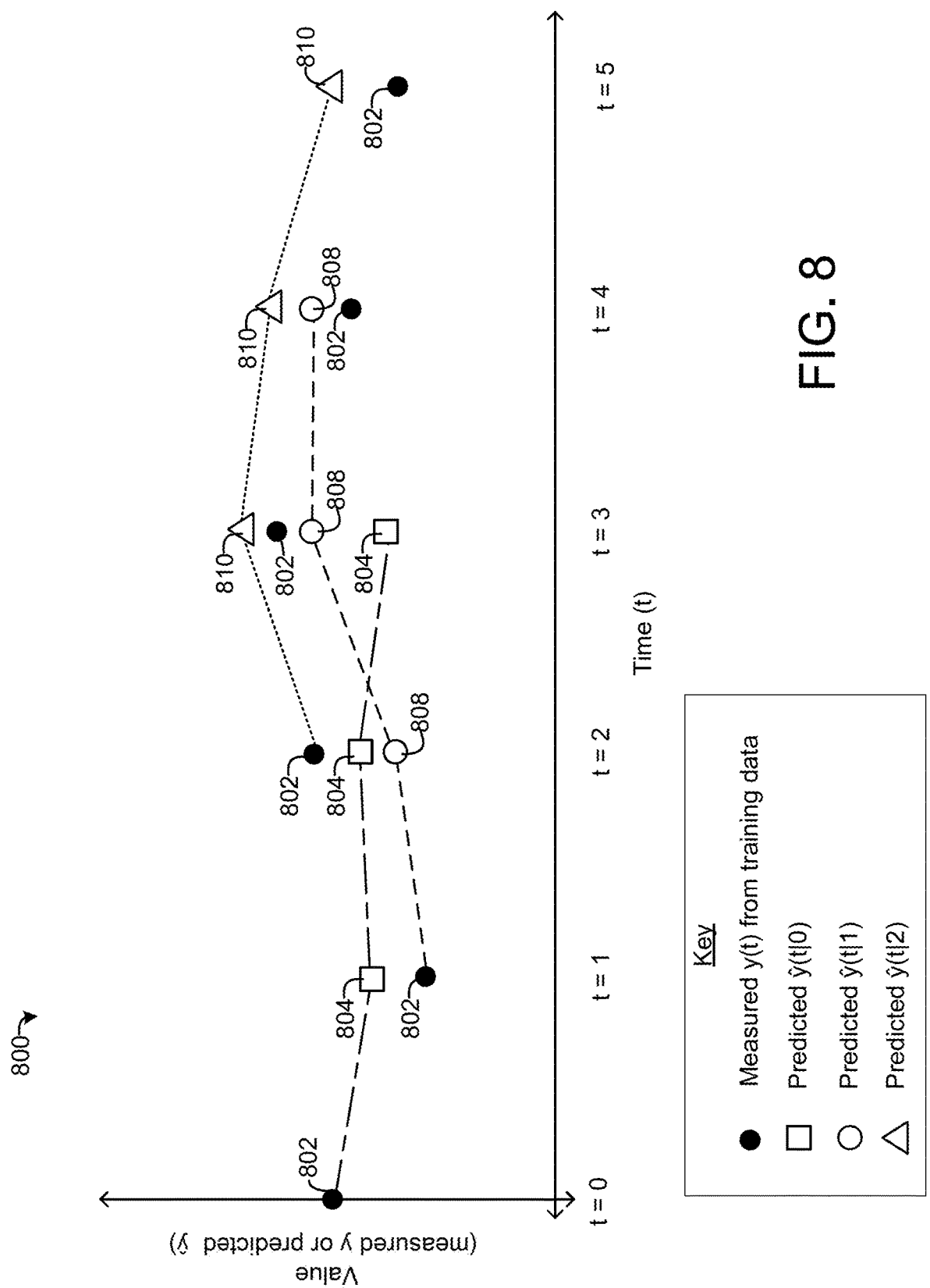
FIG. 8 is a visualization useful in illustrating the multi-step ahead prediction error method of FIG. 7, according to some embodiments.
Figure 9:
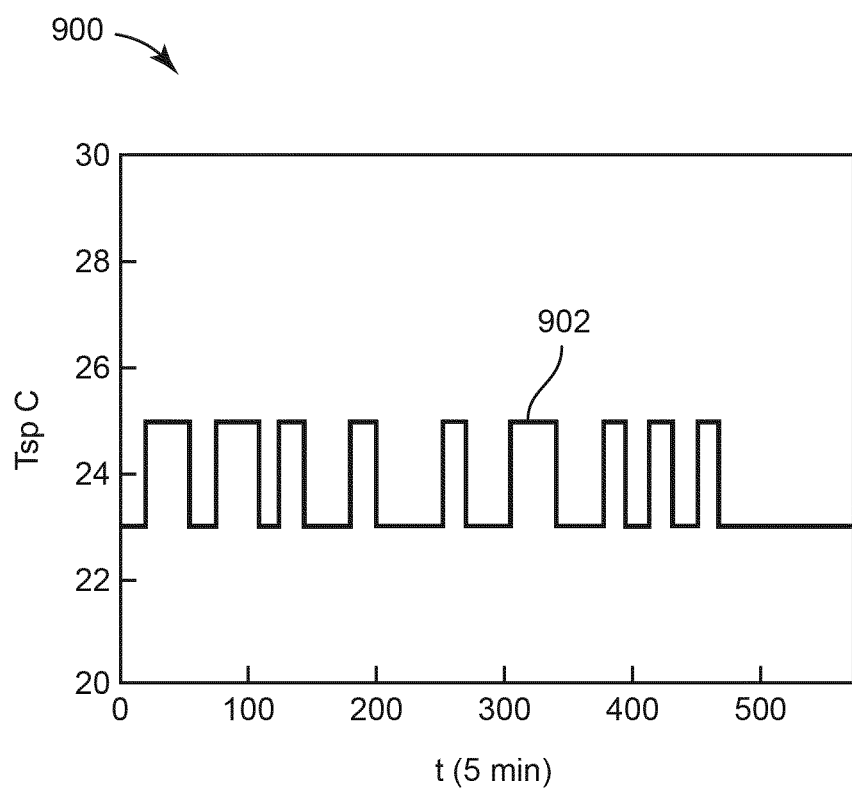
FIG. 9 is graph of an excitation signal used in a cooling experiment to test the controller of FIG. 4, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step k+h given the past input-output sequence $Z^{k-1}$ and using parameters $\phi$. The index h corresponds the number of steps ahead the prediction is made, and for each time step k predictions are made for h=0, ..., $h_{max}$ (i.e., when h=2, the prediction is three steps ahead because h is indexed from zero).

Each multiple multi-step ahead prediction $\hat{y}(k+h|k-1, \phi)$ is then compared to the corresponding measured output y(k) by the prediction error function generator 430 to determine the prediction error at k, defined as $\varepsilon(k, \theta) := y(k) - \hat{y}(k+h|k-1, \phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h|k-1, \phi)\|_2^2.$$ (Eq. M)

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi V_N(\phi, Z^N).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1)=Ax(k)+Bu(k);$$

$$y(k)=Cx(k)+Du(k).$$

where the one-step prediction of $\hat{x}(k+1|k)$ using a steady-state Kalman gain is:

$$\hat{x}(k+1)=A\hat{x}(k|k-1)+Bu(k)+K(y(k)-C\hat{x}(k|k-1)-Du(k));$$

$$\hat{y}(k|k-1)=C\hat{x}(k|k-1)+Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x0) is given by the equation:

$$\hat{x}(1|0)=Ax0+Bu(0)+K(y(0)-Cx0-Du(0));$$

$$\hat{y}(0|0)=Cx0+Du(0).$$

The prediction of the second step is $$\hat{x}(2|0)=A\hat{x}(1|0)+Bu(1)=A(Ax0+Bu(0)+K(y(0)-Cx0-Du(0)))+Bu(1);$$

$$\hat{y}(1|0)=C\hat{x}(1|0)+Du(1)=C(Ax0+Bu(0)+K(y(0)-Cx0-Du(0)))+Du(1);$$

The prediction of the third step is $$\hat{x}(3|0) = A\hat{x}(2|0) + Bu(2) =$$
$$A(A(Ax0 + Bu(0) + K(y(0) - Cx0 - Du(0))) + Bu(1)) + Bu(2);$$
$$\hat{y}(2|0) = C\hat{x}(2|0) + Du(2) =$$
$$C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) =$$
$$A(A(A(Ax0 + Bu(0) + K(y(0) - Cx0 - Du(0))) + Bu(1)) + Bu(2)) + Bu(3);$$
$$\hat{y}(3|0) = C\hat{x}(3|0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0)=Ax0+Bu(0)+K(y(0)-Cx0-Du(0));$$

$$\hat{x}(2|0)=(A^2-AKC)x0+(AB-AKD)u(0)+Bu(1)+AKy(0);$$

$$\hat{x}(3|0)=(A^3-A^2KC)x0+(A^2B-A^2KD)u(0)+ABu(1)+Bu(2)+A^2Ky(0);$$

$$\hat{x}(4|0)=(A^4-A^3KC)x0+(A^3B-A^3KD)u(0)+A^2Bu(1)ABu(2)+Bu(3)+A^3Ky(0);$$

$$\hat{y}(0)=Cx0+Du(0);$$

$$\hat{y}(1|0)=(CA-CKC)x0+(CB-CKD)u(0)+Du(1)+CKy(0);$$

$$\hat{y}(2|0)=(CA^2-CAKC)x0+(CAB-CAKD)u(0)+CBu(1)+Du(2)+CAKy(0);$$

$$\hat{y}(3|0)=(CA^3-CA^2KC)x0+(CA^2B-CA^2KD)u(0)+CABu(1)+CBu(2)+Du(3)+CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{\hat{y}}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1|0) = Ax0 + [B \ 0 \ 0 \ 0 \ 0 \ 0]\tilde{u}(0) + [K \ 0 \ 0 \ 0](\tilde{y}(0) - \tilde{\hat{y}}(0);$$

$$\tilde{\hat{y}}(0) = \begin{bmatrix} C \\ (CA - CKC) \\ (CA^2 - CAKC) \\ (CA^3 - CA^2KC) \end{bmatrix} x0 +$$

$$\begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} - \tilde{y}(0).$$

In order to have the general formulation at time k for predicting $h_{max}$ step ahead in time, this four-step example can be extrapolated to define the general augmented input and output vectors as:

$$\tilde{\hat{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k|k-1) +$$

$$\begin{bmatrix} D & 0 & 0 & 0 & 0 & 0 & 0 \\ (CB-CKD) & D & 0 & 0 & 0 & 0 & CK \\ (CAB-CAKD) & CB & D & 0 & 0 & 0 & CAK \\ \begin{pmatrix} CA^2B- \\ CA^2KD \end{pmatrix} & CAB & \ddots & \ddots & 0 & 0 & CA^2K \\ \vdots & \vdots & \ddots & CB & D & 0 & \vdots \\ \begin{pmatrix} CA^{h_{max}-1}B- \\ CA^{h_{max}-1}KD \end{pmatrix} & CA^{h_{max}-2}B & \cdots & CAB & CB & D & CA^{h_{max}-1}K \end{bmatrix}$$

$$\tilde{u}(k) = \begin{bmatrix} u(k) \\ u(k+1) \\ \vdots \\ u(k+h_{max}) \\ y(k) \end{bmatrix}, \tilde{\hat{y}}(k) = \begin{bmatrix} \hat{y}(k|k-1) \\ \hat{y}(k+1|k-1) \\ \vdots \\ \hat{y}(k+h_{max}|k-1) \end{bmatrix}, \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1|k) = A\hat{x}(k|k-1) + [B\ 0\ \ldots\ 0]\tilde{u}(k) + [K\ 0\ \ldots\ 0](\tilde{y}(k) - \tilde{\hat{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad (Eq.\ M)$$

If w(h)≡1 for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \tilde{\hat{y}}(k, \theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
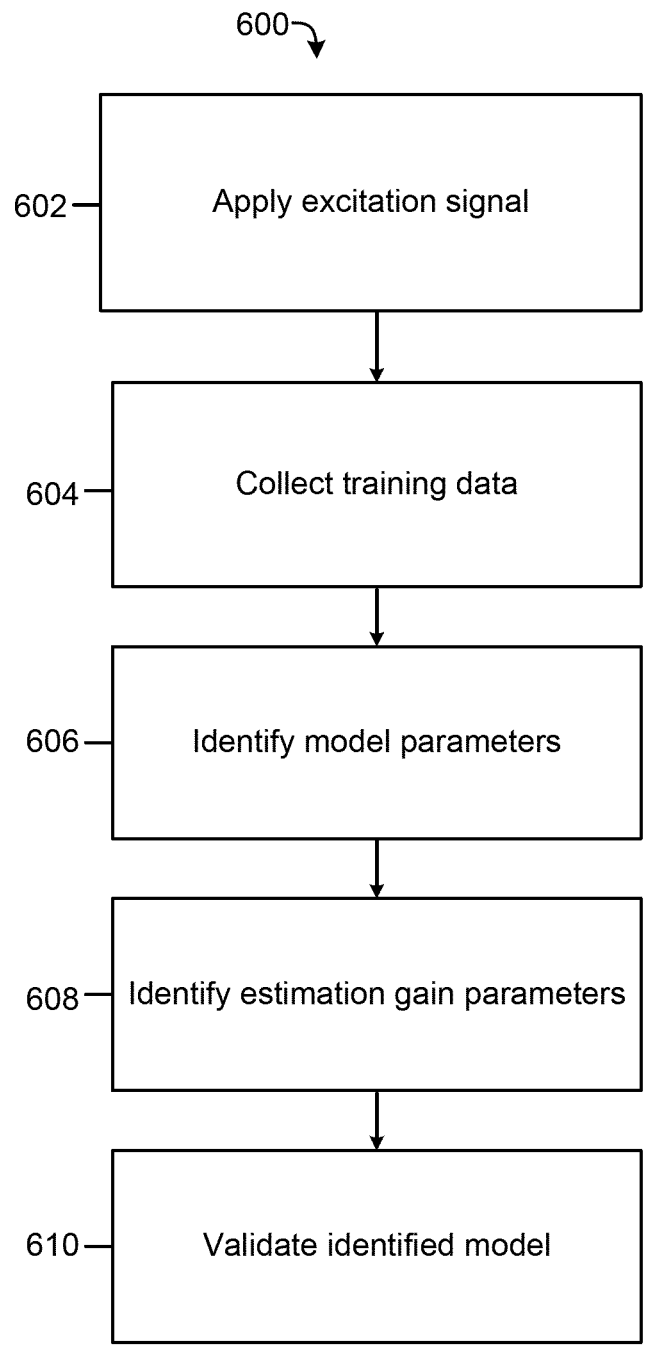
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k=0, ..., N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad (Eq.\ G)$$

$$y(t) = C_c(\theta)x(t) + D_c(\theta)u(t); \quad (Eq.\ H).$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N = [y(1), u(1), y(2), u(2), \ldots, y(N), u(N)]$ from the training data database 410. The training data includes measured outputs y(k) (i.e., $T_{ia}(k)$ and $\dot{Q}_{HVAC}(k)$) and inputs $u(k)$ (i.e., $T_{oa}(k)$ and $T_{sp}(k)$) for each time step k, k=1, ..., N. N is the number of samples in the training data. The gain parameter identifier 420 also receives the system model from the system parameter identifier 418.

At step 704, the prediction error function generator 430 uses the training data for a time step k to predict outputs $\hat{y}$ for each subsequent time step up to $k+h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs $[\hat{y}(k|k-1), \hat{y}(k+1|k-1), \ldots \hat{y}(k+h_{max}|k-1)]$ are predicted based on the past training data (i.e., through step k−1), denoted as $Z^{k-1}$, along with future inputs $[u(k), u(k+1) \ldots u(k+h_{max})]$. These predictions are made using the model $\mathcal{M}(\phi)$, such that predicted outputs $\hat{y}$ depend on $\phi$.

To illustrate the predictions of step 704, FIG. 8 shows a simplified visualization in which $y(k)$ and $\hat{y}(k)$ are depicted as scalar values for the sake of simplified explanation. In FIG. 8, the graph 800 plots the values of y and $\hat{y}$ over time t for five time steps past a starting time t=0. The solid circles 802 represent measured outputs y(t) from the training data. The unfilled boxes 804 represent predicted outputs $\hat{y}(t|0)$, that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions $\hat{y}(t|0)$, 1≤t≤3, represented by the unfilled boxes 804 were based on the measured value of y(0).

At step 706, the prediction error function generator 430 compares the predicted outputs $\hat{y}$ to the measured outputs y for each future step up to $k+h_{max}$ (i.e., for all predicted outputs $\hat{y}$ generated at step 704). More specifically, an error term for each step may be defined as $y(k+h)-\hat{y}(k+h|k-1, \phi)$. Because y and $\hat{y}$ are vectors, the two-norm of this error term may be taken and squared to facilitate comparison between prediction errors as scalars, such that the error term becomes $\|y(k+h)-\hat{y}(k+h|k-1, \phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds the w(h) term in Eq. M above.

The process 700 then returns to step 704 to repeat steps 704-706 for each value of k, k=1, N-$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., $\hat{y}(t|1)$, for t=2, 3, 4. The unfilled triangles chart the predictions based on the output data available at time t=2, i.e., $\hat{y}(t|2)$, for t=3, 4, 5. Process 700 therefore involves making multiple predictions for most time steps: for example, FIG. 8 shows three separate predictions for time t=3.

At step 706, the prediction error function generator 430 again compares the predicted outputs $\hat{y}$ for the new value of k to the measured outputs y for each future step up to $k+h_{max}$ to define the error term $\|y(k+h)-\hat{y}(k+h|k-1, \theta)\|_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h)\|y(k+h) - \hat{y}(k+h|k-1, \phi)\|_2^2. \quad \text{(Eq. M)}$$

The prediction performance function is a function of the input data $Z^N$ and the parameter variable $\phi$. Typically, the input data $Z^N$ is given (i.e., received by the model identifier 412 and used in the calculation of error terms as described above). Thus, the prediction performance function is primarily a function of $\phi$.

At step 712, the prediction performance function $V_N(\phi, Z^N)$ is minimized to find an optimal parameter vector $\hat{\theta}_N=\arg\min_{\theta \in D_M} V_N(\phi, Z^N)$. Any minimization procedure may be followed. The result of step 712 is a vector $\hat{\phi}_N$ of identified model parameters that tune the model $\mathcal{M}(\hat{\phi}_N)$ to accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Experimental Results

To illustrate the advantages of the systems and methods described above, the following experimental results are included and shown in FIGS. 9-18. The HVAC system 100 and the building 10 were put through two experiments: a heating and a cooling experiment.

Heating Experiment

In the heating experiment, a simulated HVAC system 100 is in a heating mode to heat a simulated building 10. Because the system is simulated the actual values of the system parameters and the unmeasured time-varying disturbances ($\dot{Q}_{other}$) are known in the experiment for sake of comparison to the identified model.

To start, the controller 212 provides excitation signal to the HVAC equipment 210. The excitation signal 902 illustrated on graph 900 in FIG. 9 varies the temperature setpoint $T_{sp}$ using a pseudorandom binary signal that varies between the maximum and minimum allowable temperatures in the comfort zone ($T_{max}$=25° C., $T_{min}$=23° C.).

While the excitation signal is applied to the HVAC equipment 210, training data is collected and stored in the controller 212 for each time step k as described above. Each time step k in the heating experiment corresponds to five minutes of time (i.e., a data sample is recorded every five minutes). The training data is used by the system parameter identifier 418 to identify the model parameters as described above. In the heating experiment, the following results were found:

| Identified Parameters | Actual Parameters |
|---|---|
| $C_{ia,id}$ = 2.287037e+003 | $C_{ia}$ = 1.0448e+04 |
| $C_{s,id}$ = 3.2507187e+03 | $C_s$ = 3.4369e+05 |
| $R_{si,id}$ = 0.57426198230 | $R_{si}$ = 0.0863 |
| $R_{oi,id}$ = 0.69936 | $R_{oi}$ = 0.3302 |
| $\tau_{I,id}$ = 182.74 | $\tau_I$ = 180 |
| $K_{c,id}$ = 2.637 | $K_c$ = 12 |

The first step of model parameterization, carried out by the system parameter identifier 418, thereby determined the parameters to the correct order of magnitude, but some differences are present due to the time-varying disturbances (i.e., $\dot{Q}_{other}$).

Figure 10:
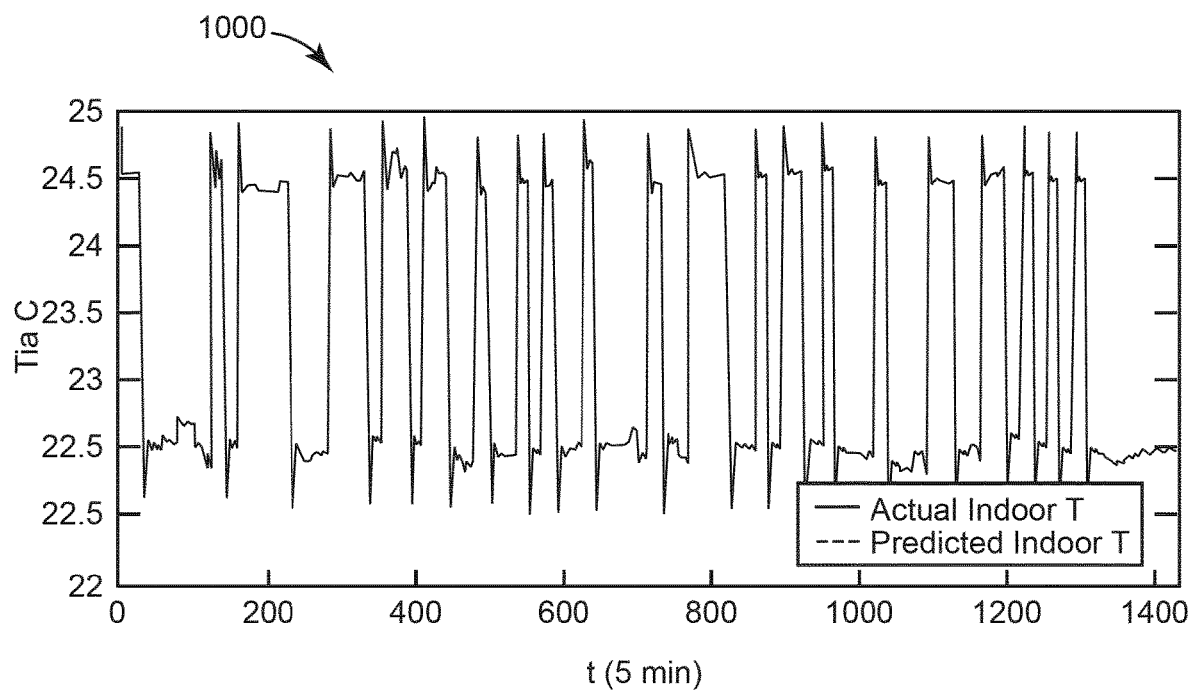
FIG. 10 is a first graph of results of the cooling experiment of FIG. 9, according to an example experiment.
Figure 11:
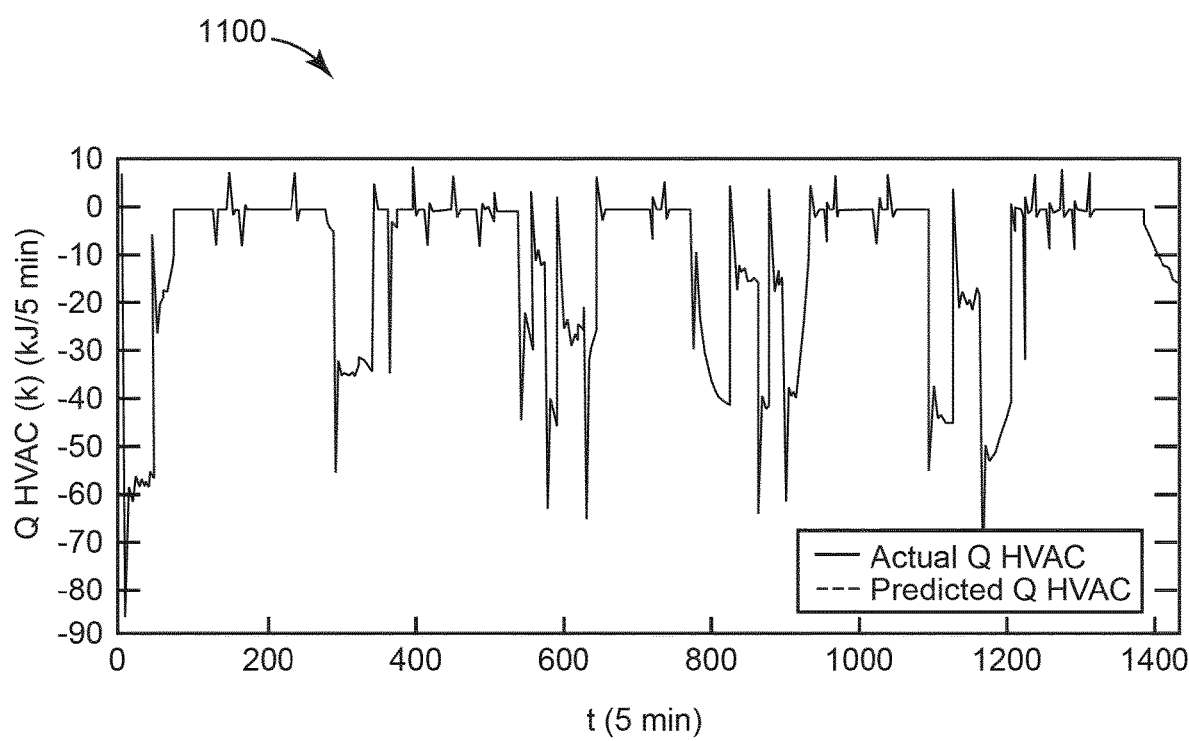
FIG. 11 is a second graph of results of the cooling experiment of FIG. 9, according to an example experiment.

Next, the Kalman gain parameters are identified by the gain parameter identifier 420. In the experiment, the gain parameters are identified using a one-step ahead prediction error method, a two-step ahead prediction error method, a five-step ahead prediction error method, a ten-step ahead prediction error method, and a fifty-step ahead prediction error method. As an example of the results, FIG. 10 shows a graph 1000 of the actual indoor temperature and the predicted indoor temperature over time as generated by the five-step ahead prediction error method. FIG. 11 shows a graph 1100 of the actual $\dot{Q}_{HVAC}$ and the predicted $\dot{Q}_{HVAC}$ over time as generated by the five-step ahead prediction error method. As shown in FIGS. 10 and 11, the predicted values of $T_{ia}$ and $\dot{Q}_{HVAC}$ consistently track the actual values.

Figure 12:
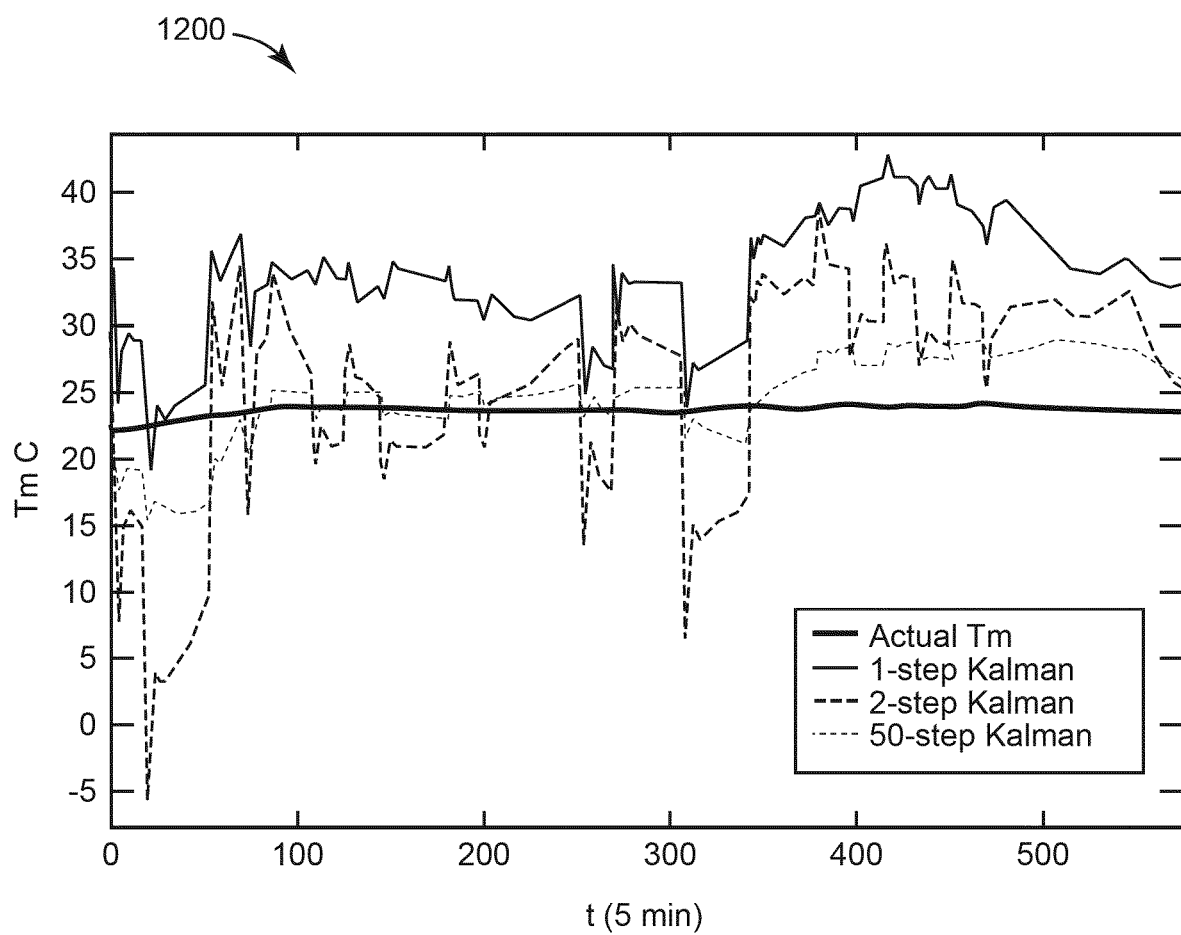
FIG. 12 is a third graph of results of the cooling experiment of FIG. 9, according to an example experiment.

The different number of steps (i.e., $h_{max}$ values) were included to allow comparison between the parameters identified using different numbers of steps. The Kalman gains identified using the various numbers of steps are presented in the following table:

FIG. 12 shows a graph 1200 of the estimated building mass temperature $T_m$ over time for the one-step prediction error method, the two-step prediction error method, and the fifty-step prediction error method, as well as the actual $T_m$ of the simulated building 10. As the number of steps increase, the $T_m$ estimates improve, following the actual $T_m$ line on graph 1200 closer.

Cooling Experiment

In the cooling experiment, a simulated HVAC system 100 is in a cooling mode to cool a simulated building 10. As above, because the system is simulated the actual values of the system parameters and the unmeasured time-varying disturbances ($\dot{Q}_{other}$) are known in the experiment for sake of comparison to the identified model.

Figure 13:
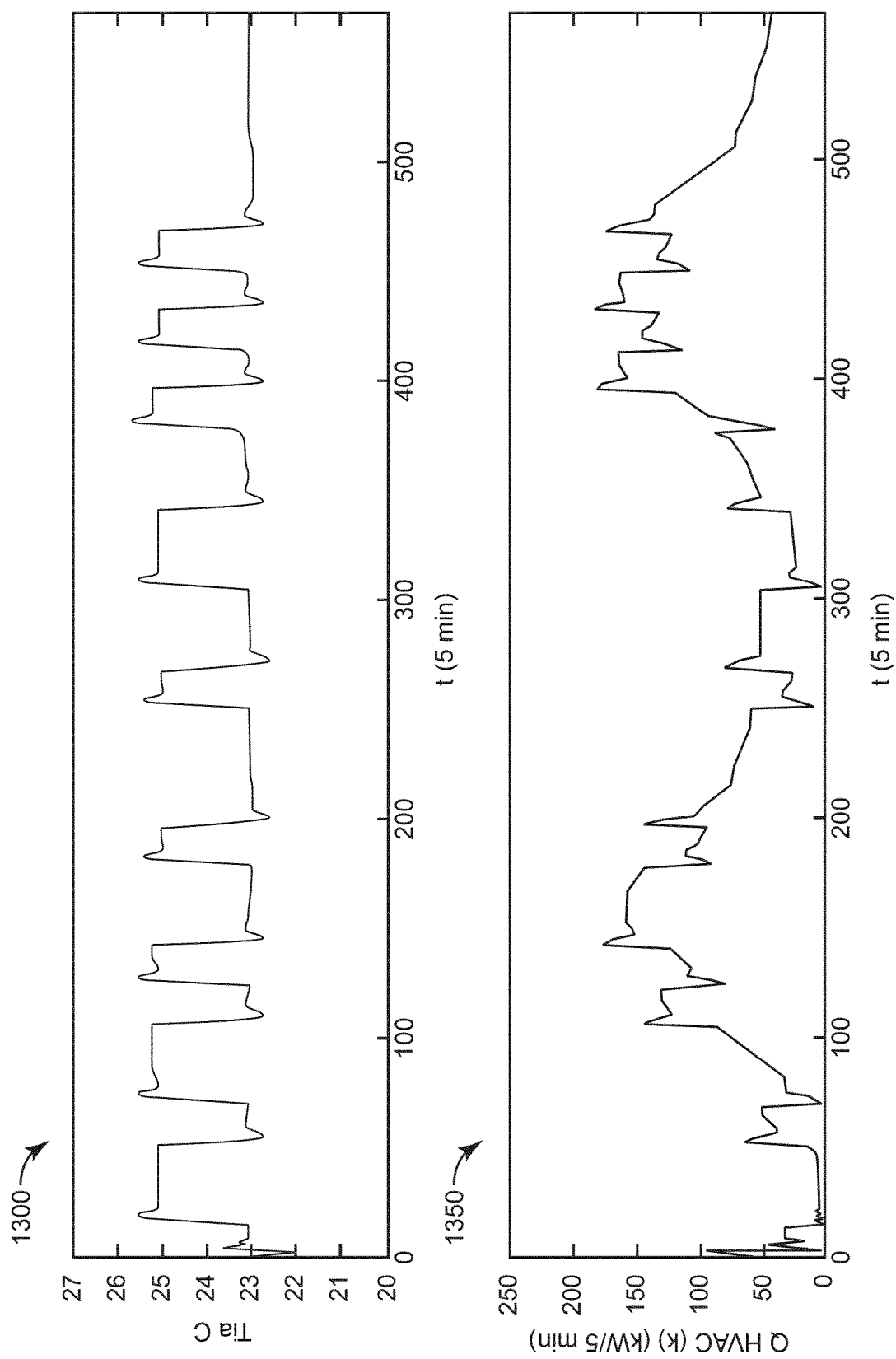
FIG. 13 is a first pair of graphs of results of a heating experiment that tests the controller of FIG. 4, according to an example experiment.
Figure 14:
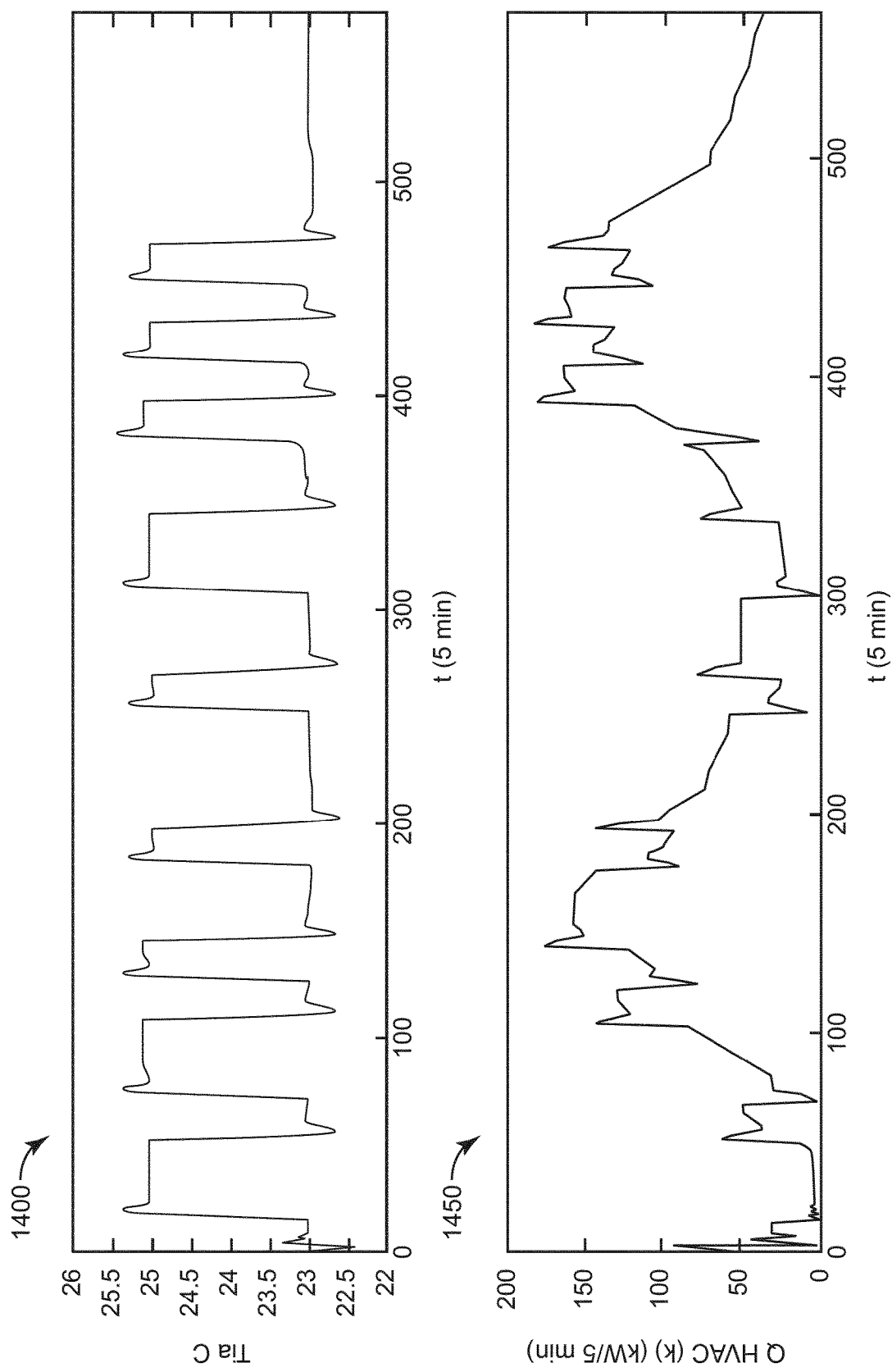
FIG. 14 is a second pair of graphs of results of the heating experiment of FIG. 13, according to an example experiment.

A similar procedure as the heating experiment is followed to generate models, with the Kalman gain generated using the multi-step prediction error method with a variety of number of steps (i.e., various prediction horizons $h_{max}$) (e.g., one step, two steps, eight steps, twelve steps, twenty steps). FIG. 13 shows output predictions generated using the one-step prediction error method compared to actual outputs, with $T_{ia}$ graphed over time on graph 1300 and $\dot{Q}_{HVAC}$ graphed over time on graph 1350. Similarly, FIG. 14 shows output predictions generated using the two-step prediction error method compared to actual outputs, with $T_{ia}$ graphed over time on graph 1400 and $\dot{Q}_{HVAC}$ graphed over time on graph 1450.

Figure 15:
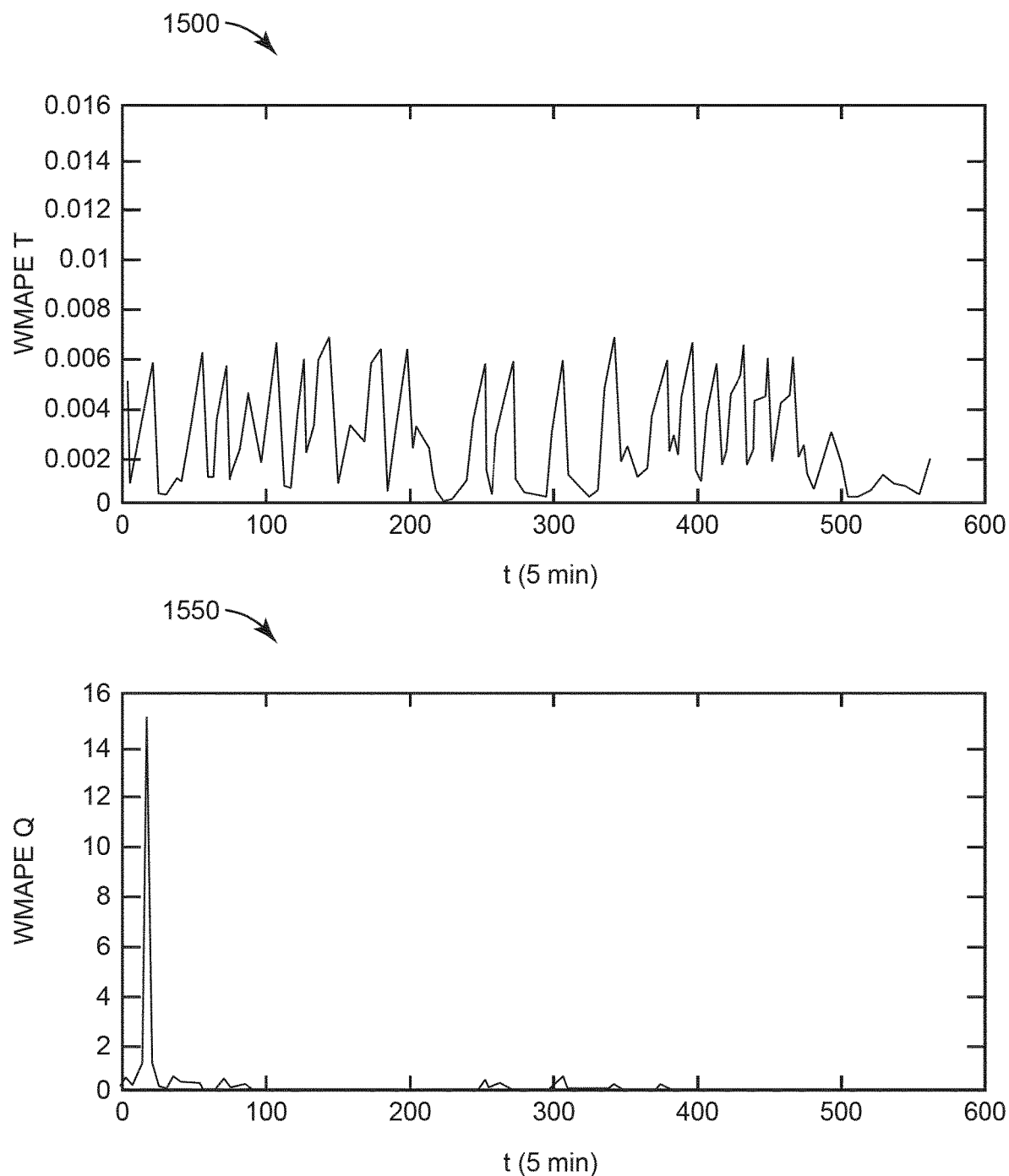
FIG. 15 is a third pair of graphs of results of the heating experiment of FIG. 13, according to an example experiment.

To compare the results of the various multi-step prediction error methods (i.e., various number of steps), several metrics are used. First, a weighted mean absolute prediction error (WMAPE) metric is an exponentially weighted average of the absolute prediction error at each time step and given by:

$$WMAPE(k) = \frac{\sum_{i=k}^{k+N_h-1} e^{-i/N_h}|y(i) - \hat{y}(i|k)|}{\sum_{i=k}^{k+N_h-1} e^{-i/N_h}}, k = 0, 1, 2, \ldots.$$

where $N_h \in \mathbb{I}_{>0}$ is the prediction horizon, y(i) is the actual output at time step i and $\hat{y}(i|k)$ is the predicted output with the identified model given a measurement at time step k and the input sequence u(k), u(k+1), . . . , u(i−1). In the WMAPE equation, y is used to refer to a scalar (i.e., one of the two outputs), and the WMAPE is computed separately for both outputs. The horizon used to calculate the WMAPE in the cooling experiment was twelve. FIG. 15 shows a graph 1500 of the WMAPE for Tia for the one-step ahead prediction error method and a 12-step ahead prediction error method for comparison. FIG. 15 also shows a graph 1550 of the WMAPE for $\dot{Q}HVAC$ for the one-step ahead prediction error method and a 12-step ahead prediction error method for comparison.

|  | 1-Step Kalman | | 2-Step Kalman | | 5-step Kalman | | 10-Step Kalman | | 50-StepKalman | |
|---|---|---|---|---|---|---|---|---|---|---|
|  | $T_{ia}$ | $\dot{Q}_{HVAC}$ | $T_{ia}$ | $\dot{Q}_{HVAC}$ | $T_{ia}$ | $\dot{Q}_{HVAC}$ | $T_{ia}$ | $\dot{Q}_{HVAC}$ | $T_{ia}$ | $\dot{Q}_{HVAC}$ |
| $T_m$ | 4.4287 | 0.3367 | 3.570 | 0.5273 | 3.2643 | 0.3119 | 1.1435 | 0.4487 | −0.4660 | 0.1126 |
| $T_{ia}$ | 1.3442 | −0.0007 | 0.908 | −0.0098 | 0.6599 | −0.0128 | 0.4876 | −0.0188 | 0.1696 | −0.0826 |
| I | −125.5 | −110.8 | 62.25 | −105.345 | 73.984 | −110.048 | 172.649 | −105.768 | 78.550 | −74.3589 |
| d | −0.0008 | 0.0005 | −0.01 | 0.0003 | −0.0015 | 0.0004 | −0.0014 | 0.0003 | −0.0003 | 0.0001 |

Figure 16:
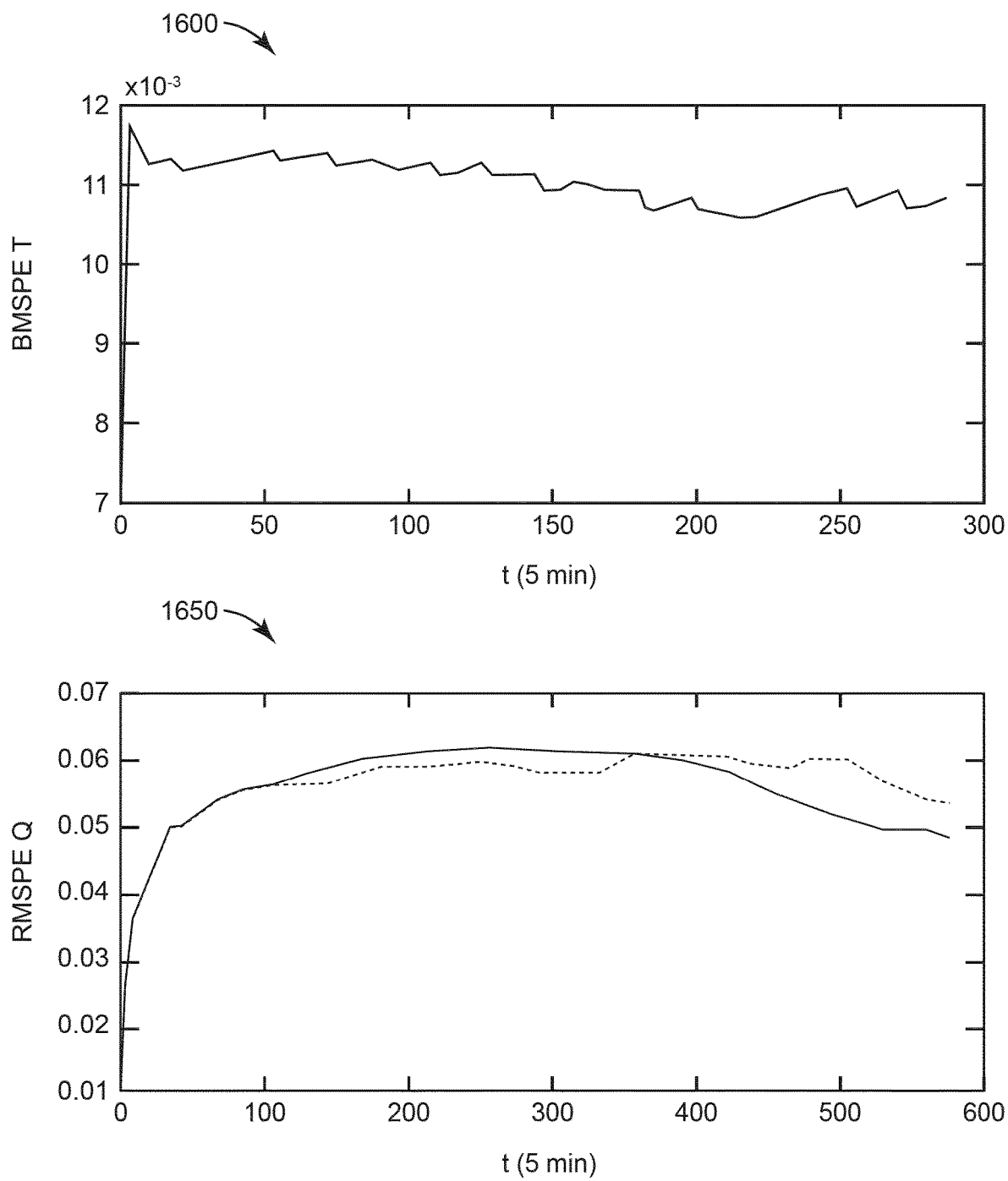
FIG. 16 is a fourth pair of graphs of results of the heating experiment of FIG. 13, according to an example experiment.

Another metric that can be used to evaluate the results of the cooling experiment is the root mean squared prediction error (RMSPE). RMSPE is calculated for a range of values of q from zero-step ahead prediction up to $N_h$-step ahead prediction. That is, given a set of measured output values {y(0), ..., y(M)} for M∈$\mathbb{I}_{\geq 0}$, the RMSPE is given by:

$$RMSPE(q) = \sqrt{\frac{\sum_{i=q+1}^{M}(y(i)-\hat{y}(i|i-q))^2}{M-q}}$$

for all q∈{0, ..., $N_h$-1}. The RMSPE helps identify the prediction error over the prediction horizon. In the example here, the RMSPE is calculated for 288 steps (i.e., $N_h$=288). FIG. 16 shows a graph 1600 of the RMSPE for $T_{ia}$ for the one-step ahead prediction error method and a two-step ahead prediction error method for comparison. FIG. 16 also shows a graph 1650 of the WMAPE for $\dot{Q}_{HVAC}$ for the one-step ahead prediction error method and the two-step ahead prediction error method for comparison.

Figure 17:
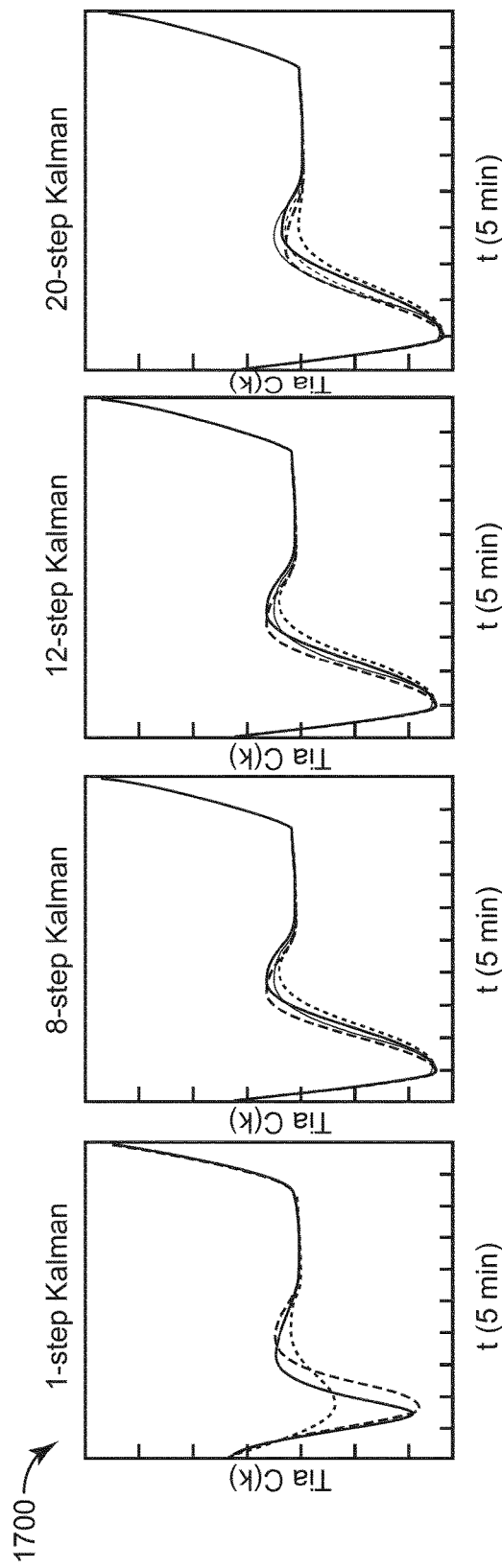
FIG. 17 is a first visualization comparing various results of the heating experiment of FIG. 13, according to an example experiment.
Figure 18:
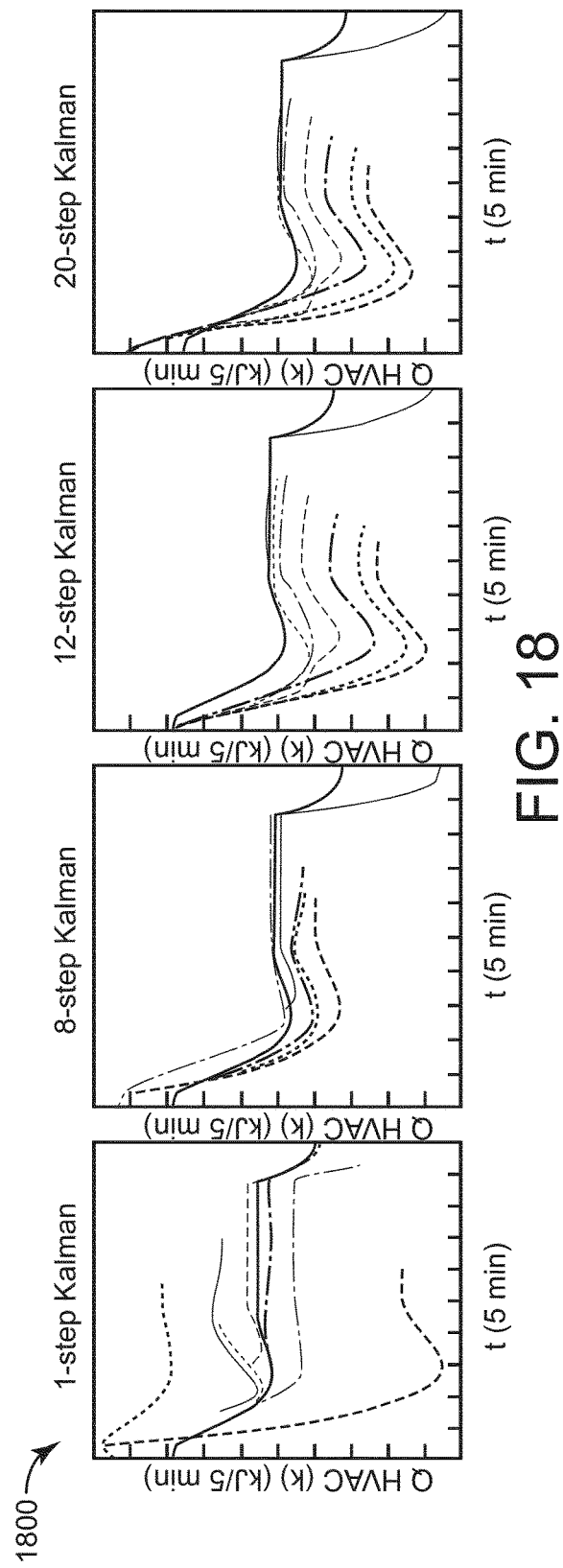
FIG. 18 is a second visualization comparing various results of the heating experiment of FIG. 13, according to an example experiment.

A third way to compare across different numbers of steps is to visualize the power of prediction. FIGS. 17 and FIG. 18 shows examples visualizations 1700 and 1800 of this third metric. To generate the visualizations 1700, 1800, ten lines of N-steps-ahead predictions are plotted using the Kalman gain generated by each multi-step ahead prediction method. That is, a first line starts x0 (i.e., an initial state) and plots the N step ahead prediction, from $\hat{x}(1|0)$ all the way to $\hat{x}(N|0)$. The second line takes $\hat{x}(1|0)$ and plots N steps ahead, and so on, until ten lines are plotted. The closer the lines are to being on top of each other, the better the output multi-step prediction. In the examples of FIGS. 15 and 16, the lines are plotted for twelve steps ahead (N=12).

The visualization 1700 of FIG. 17 is thereby generated for each of the one-step ahead prediction error method, the eight-step ahead prediction error method, the twelve-step ahead prediction error method, the twenty-step ahead prediction error method for the output $T_{ia}$. The visualization 1800 of FIG. 18 is generated in the same way for each of the one-step ahead prediction error method, the eight-step ahead prediction error method, the twelve-step ahead prediction error method, the twenty-step ahead prediction error method for the output $\dot{Q}_{HVAC}$.

In both visualization 1700 and visualization 1800, the eight-step prediction error method is shown to have the best results (i.e., the lines are plotted closest together), even though the lines were plotted twelve steps ahead. Thus, in some embodiments, an eight-step ahead prediction error method may be preferred (i.e., $h_{max}$=7). Because each time step is five minutes in the experiment, this implies that a prediction horizon of forty minutes in the Kalman gain identification is well suited for generating a model that predicts one hour (12 steps) into the future.

Heat Load Modeling

Overview

Figure 19:
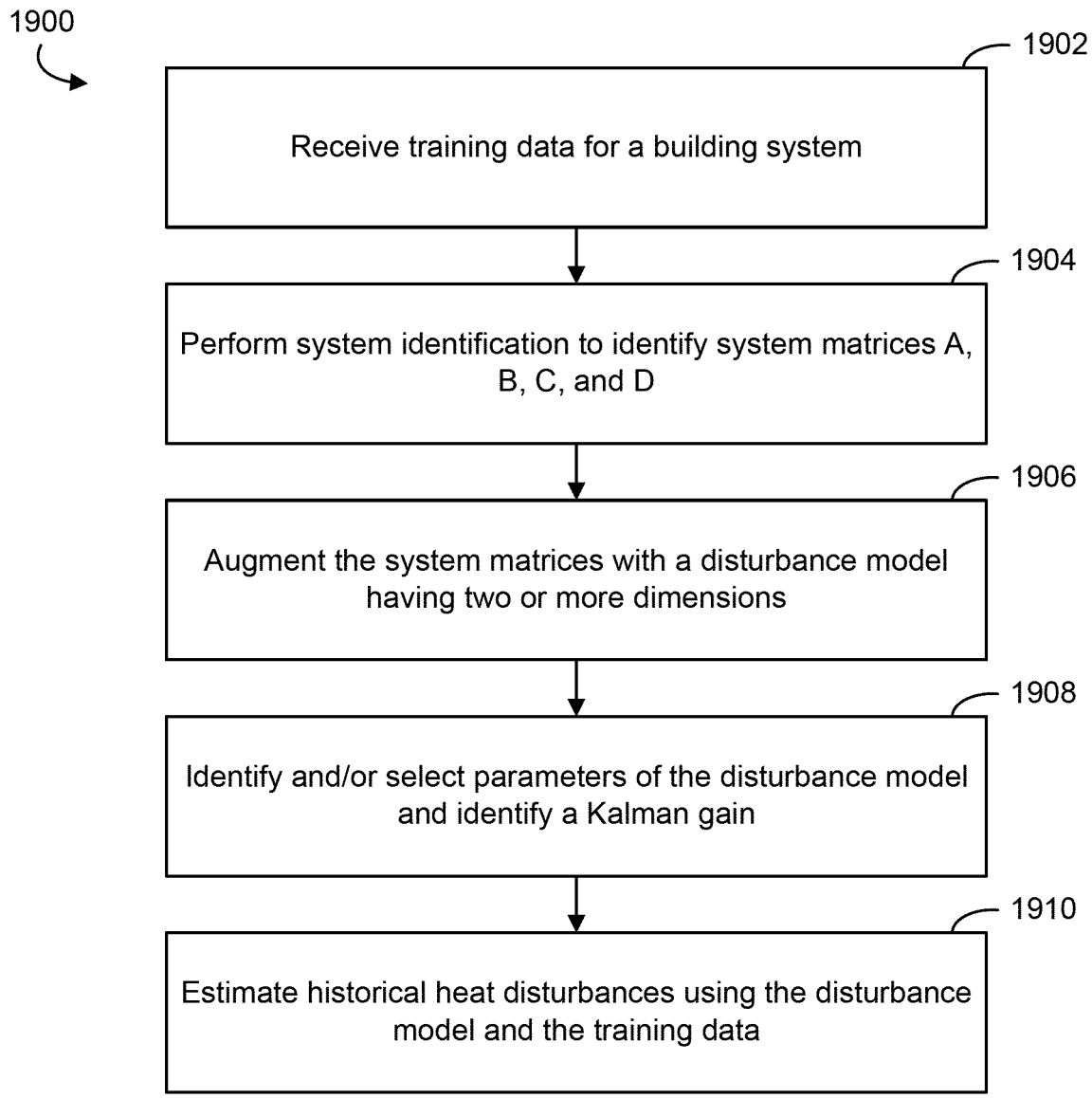
FIG. 19 is a flow diagram of a process for estimating historical heat disturbance, according to some embodiments.
Figure 20:
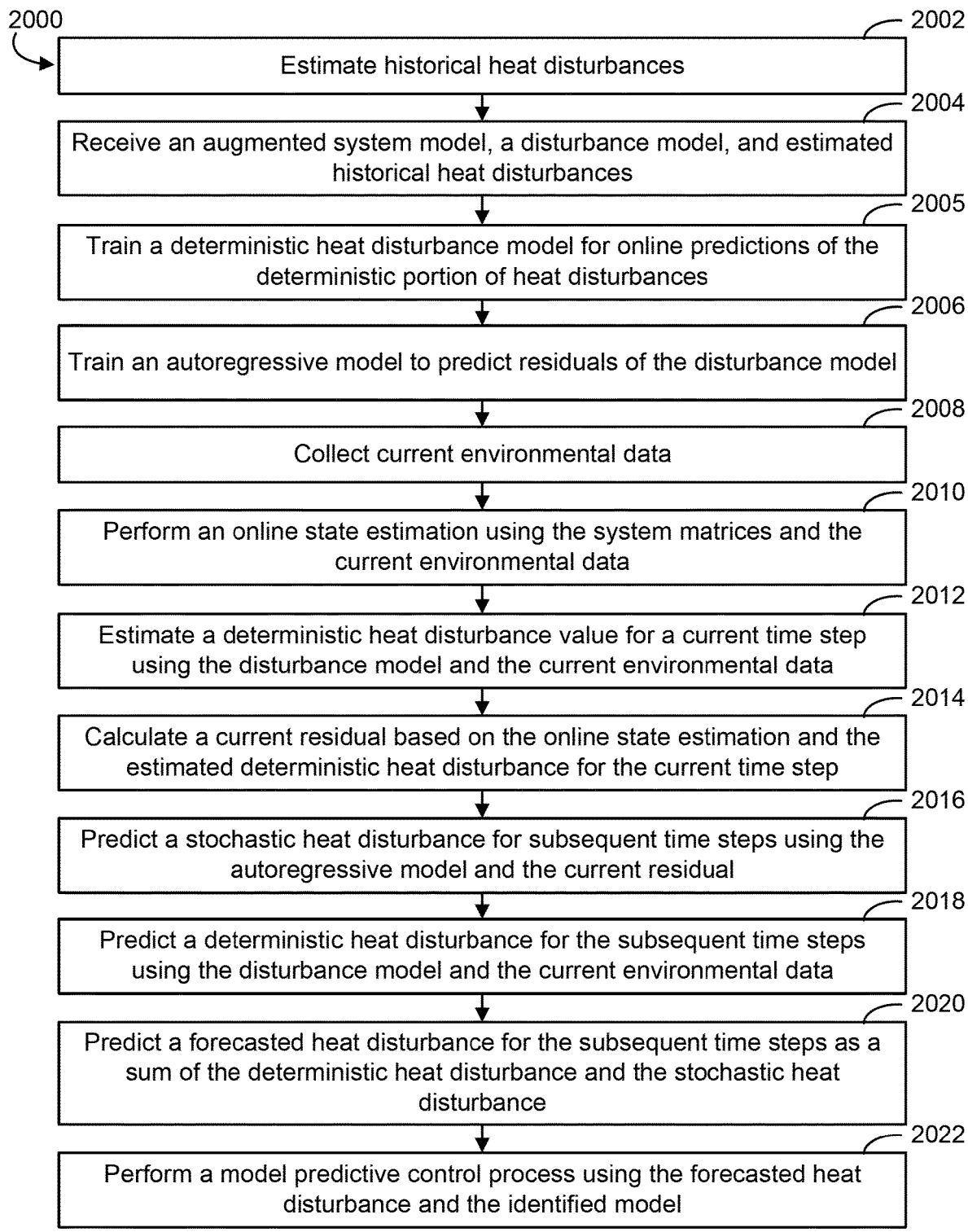
FIG. 20 is a flow diagram of a process for predicting a forecasted heat disturbance and performing model predictive control based on the forecasted heat disturbance, according to some embodiments.
Figure 21:
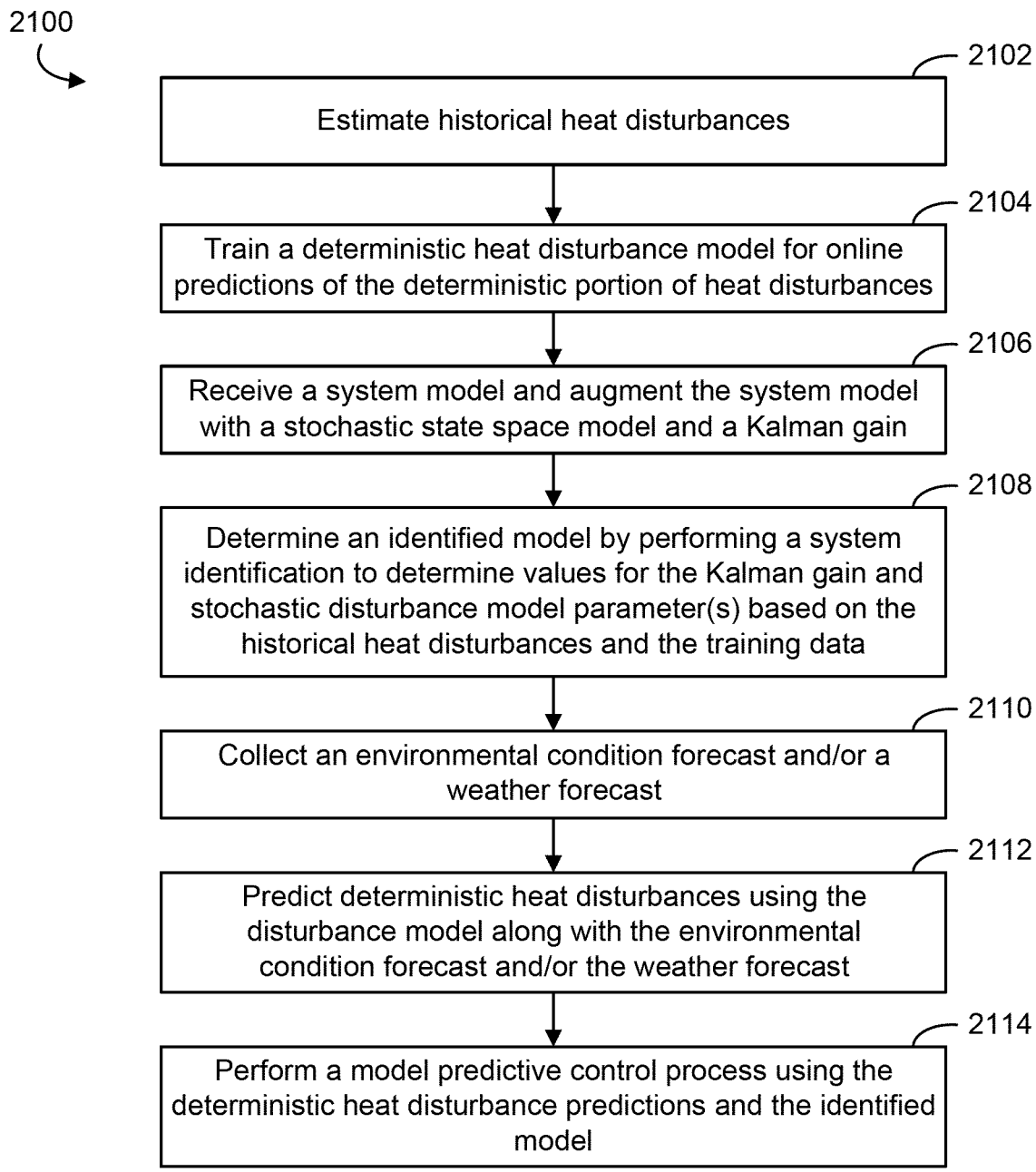
FIG. 21 is a flow diagram of a process for determining a deterministic heat disturbance and performing a model predictive control process based on the deterministic heat disturbance, according to some embodiments.

Referring generally to FIGS. 19-21, methods for estimating heat disturbance $Q_{other}$ are shown, according to some embodiments. Heat disturbance refers to heat in a building (or any space) that originates from sources beyond measurement and/or control of an environmental control system of the building. For example, heat disturbance may result from sunlight, heat radiating from electrical equipment, body heat radiation, etc. Accurately estimating heat disturbance can increase accuracy of estimations made during a model predictive control process. Without estimations of heat disturbance, a significant source of heat in a building may go unaccounted for, thus reducing accuracy of model predictive control and increasing energy usage and/or occupant discomfort.

As explained in greater detail below, heat disturbance can be modeled as a summation of a deterministic heat disturbance prediction and a stochastic heat disturbance prediction. The deterministic heat disturbance can describe a piece of a total heat disturbance that can be determined based on parameter values and initial conditions of a heat disturbance estimation problem. In some embodiments, the deterministic heat disturbance is calculated using a process for estimating deterministic load as described in U.S. patent application Ser. No. 14/717,593 filed May 20, 2015, incorporated by reference herein in its entirety. However, determining the stochastic heat disturbance, a piece of the total heat disturbance that describes some inherent randomness of the heat disturbance, can be difficult to calculate.

In some embodiments, the deterministic heat disturbance model is obtained using a pattern recognition and linear regression strategy as described in U.S. patent application Ser. No. 14/717,593 filed May 20, 2015, incorporated by reference herein in its entirety. In some embodiments, the stochastic heat disturbance model is obtained through identification of an autoregressive (AR) model separate from a system state space model used in model predictive control (MPC). In some embodiments, the stochastic heat disturbance model is obtained through identification of a model that is part of an overall state space model used in estimation and prediction during an MPC process.

Processes for Heat Load Modeling

Referring now to FIG. 19, a process 1900 for estimating historical heat disturbance is shown, according to some embodiments. By estimating historical heat disturbance based on prior data, a model can be trained to predict current and future heat disturbances for use in performing model predictive control. The historical heat disturbance can be used to train a model for determining how heat disturbance affects a space (e.g., a zone in a building). In some embodiments, some and/or all steps of process 1900 are performed by controller 212 described with reference to FIG. 2.

Process 1900 is shown to include receiving training data for a building system (step 1902), according to some embodiments. The training data for the building system may describe measurements of various environmental information taken at previous time steps and control inputs of the system, for example as described above with reference to training data generator 408 and training data database 410. For example, the measurements may include information such as building temperature measurements, building humidity measurements, occupancy measurements, electrical usage measurements, time of day, day of week, external weather conditions, etc. As heat disturbance can originate from many sources, large amounts of training data may be necessary to properly estimate historical heat disturbance. In some embodiments, the training data received in step 1902 includes time-series data. Time-series data can further indicate how heat disturbance changes over time. For example, in the middle of a day when occupants are present in the building system, a higher heat disturbance due to thermal radiation of people may be present than in the middle of the night when fewer occupants are present. In some embodiments, the training data is refined using a saturation detection and removal process. System and methods for saturation detection and removal suitable for use to refine the training data are described in U.S. patent application Ser. No. 15/900,459, filed Feb. 20, 2018, incorporated by reference herein in its entirety. In some embodiments, step 1902 is performed by controller 212.

Process 1900 is shown to include performing system identification to identify system matrices A, B, C, and D (step 1904), according to some embodiments. Based on the system matrices A, B, C, and D, a system model determined via the system identification can be used when estimating heat disturbance. In some embodiments, the system identification performed in step 1904 to identify the system model is similar to and/or the same as the system identification process as described in U.S. patent application Ser. No. 16/240,028, filed Jan. 4, 2019, incorporated by reference herein in its entirety. By identifying the system matrices, a system model can be captured to be used in determining heat disturbance. In general, the system matrices describe dynamics of the system. In step 1904, the system model identified can illustrate dynamics (e.g., thermal dynamics) of the building system based on the training data. In some embodiments, step 1904 is similar to and/or the same as process 600 described with reference to FIG. 6. In some embodiments, step 1904 is performed by controller 212.

Process 1900 is shown to include augmenting the system matrices with a disturbance model having two or more dimensions (step 1906), according to some embodiments. In general, an augmented system of the system identified in step 1904 is given by the following state space representation:

$$\begin{bmatrix} \dot{x}(t) \\ \dot{d}(t) \end{bmatrix} = \begin{bmatrix} A_c & B_d \\ 0 & A_d \end{bmatrix} \begin{bmatrix} x(t) \\ d(t) \end{bmatrix} + \begin{bmatrix} B_c \\ B_{dd} \end{bmatrix} u(t); \quad \text{(Eq. N)}$$

$$y(t) = \begin{bmatrix} C_c & C_d \end{bmatrix} \begin{bmatrix} x(t) \\ d(t) \end{bmatrix} + D_c u(t); \quad \text{(Eq. O)}$$

where $A_d$, $B_d$, $B_{dd}$, and $C_d$ are matrices characterizing the disturbance model and the parameters $A_c$, $B_c$, $C_c$, and $D_c$ are the matrices A, B, C, D identified in step 1904. In some embodiments, the disturbance model is a parameterized model such that the parameterized model can generate accurate models of heat disturbance over repeated usages of the model given various parameters.

In some embodiments, the disturbance model is determined based on a known higher order disturbance model. The disturbance model is described in greater detail in Eq. T and Eq. U below with reference to step 1908. If the disturbance model is determined based on a known higher order disturbance model, an augmented system of the system identified in step 1904 may have the following form:

$$\begin{bmatrix} \dot{T}_{ia} \\ \dot{T}_m \\ \dot{I} \\ \dot{d}_1 \\ \dot{d}_2 \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} & 0 \\ \frac{1}{C_m R_{mi}} & -\frac{1}{C_m R_{mi}} & 0 & 0 & 0 \\ -1 & 0 & 0 & 0 & 0 \\ 0 & 0 & 0 & 0 & 1 \\ 0 & 0 & 0 & -w^2 & -2\gamma \end{bmatrix} \begin{bmatrix} T_{ia} \\ T_m \\ I \\ d_1 \\ d_2 \end{bmatrix} + \begin{bmatrix} \frac{K_p}{C_{ia}} & \frac{1}{C_{ia}R_{oi}} \\ 0 & 0 \\ 1 & 0 \\ & B_{dd} \end{bmatrix} \begin{bmatrix} T_{sp} \\ T_{oa} \end{bmatrix}; \quad \text{(Eq. P)}$$

$$\begin{bmatrix} T_{ia} \\ \dot{Q}_{HVAC} \end{bmatrix} = \begin{bmatrix} 1 & 0 & 0 & 0 & 0 \\ -K_p & 0 & K_I & 0 & 0 \end{bmatrix} \begin{bmatrix} T_{ia} \\ T_m \\ I \\ d_1 \\ d_2 \end{bmatrix} + \begin{bmatrix} 0 & 0 \\ K_p & 0 \end{bmatrix} \begin{bmatrix} T_{sp} \\ T_{oa} \end{bmatrix}; \quad \text{(Eq. Q)}$$

where $d_1$ is a disturbance state that can estimate (or calculate) values of heat disturbance, $d_2$ is a disturbance state that can estimate (or calculate) a rate of change in values of the heat disturbance, w is a frequency tuning parameter, y is a damping tuning parameter, $B_{dd}$ is a matrix mapping a forcing input, $T_{sp}$ is an indoor air temperature setpoint, and $T_{oa}$ is an outdoor air temperature, and all other variables are defined as in Eq. E and Eq. F above. In the above augmented system, $d_1$ includes the entirety of $\dot{Q}_{other}$ such that $\dot{Q}_{other}$ is not explicitly identified in the augmented system. As such, if $d_1$ is identified, $\dot{Q}_{other}$ may inherently be identified as well. Similarly, if the disturbance model is determined based on the identified disturbance model, the system identified in step 1904 may have the following form:

$$\begin{bmatrix} \dot{T}_{ia} \\ \dot{T}_m \\ \dot{I} \\ \dot{d}_1 \\ \dot{d}_2 \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} & 0 \\ \frac{1}{C_m R_{mi}} & -\frac{1}{C_m R_{mi}} & 0 & 0 & 0 \\ -1 & 0 & 0 & 0 & 0 \\ 0 & 0 & 0 & \theta_1 & \theta_2 \\ 0 & 0 & 0 & \theta_3 & \theta_4 \end{bmatrix} \begin{bmatrix} T_{ia} \\ T_m \\ I \\ d_1 \\ d_2 \end{bmatrix} + \begin{bmatrix} \frac{K_p}{C_{ia}} & \frac{1}{C_{ia}R_{oi}} \\ 0 & 0 \\ 1 & 0 \\ \theta_5 & \theta_6 \\ \theta_7 & \theta_8 \end{bmatrix} \begin{bmatrix} T_{sp} \\ T_{oa} \end{bmatrix}; \quad \text{(Eq. R)}$$

$$\begin{bmatrix} T_{ia} \\ \dot{Q}_{HVAC} \end{bmatrix} = \begin{bmatrix} 1 & 0 & 0 & 0 & 0 \\ -K_p & 0 & K_I & 0 & 0 \end{bmatrix} \begin{bmatrix} T_{ia} \\ T_m \\ I \\ d_1 \\ d_2 \end{bmatrix} + \begin{bmatrix} 0 & 0 \\ K_p & 0 \end{bmatrix} \begin{bmatrix} T_{sp} \\ T_{oa} \end{bmatrix}; \quad \text{(Eq. S)}$$

where $\theta_1$ through $\theta_8$ are parameters that can be identified or set to a prospected value, and all other variables being the same as above. In general, the augmented system model can be used for determining historic heat disturbances. In some embodiments, step 1906 is performed by controller 212.

Process 1900 is shown to include identifying and/or selecting parameters of the disturbance model and identifying a Kalman gain (step 1908), according to some embodiments. In some embodiments, the parameters are determined using a known higher order disturbance model. Using the known higher order disturbance model, a rate of change in estimated historical heat disturbance values can be captured. Further, periodic heat disturbances can be represented using the known higher order disturbance model. For example, solar irradiance may follow a periodic schedule with a peak around noon each day. In some embodiments, the known higher order disturbance model is a second order disturbance model of an oscillator system having two states, $d_1$ and $d_2$, where $d_1$ can estimate (or calculate) values of heat disturbance and $d_2$ can estimate (or calculate) a rate of change in values of the heat disturbance. In general, the oscillator system may have the following form:

$$\begin{bmatrix} \dot{d}_1(t) \\ \dot{d}_2(t) \end{bmatrix} = A_d \begin{bmatrix} d_1(t) \\ d_2(t) \end{bmatrix} + B_{dd}u(t) + \begin{bmatrix} 0 & 1 \\ -w^2 & -2\gamma \end{bmatrix} \begin{bmatrix} d_1(t) \\ d_2(t) \end{bmatrix} + B_{dd} \begin{bmatrix} T_{sp} \\ T_{oa} \end{bmatrix}; \quad \text{(Eq. T)}$$

or compactly as:

$$\begin{bmatrix} \dot{d}_1 \\ \dot{d}_2 \end{bmatrix} = A_d \begin{bmatrix} d_1 \\ d_2 \end{bmatrix} + B_{dd}u = \begin{bmatrix} 0 & 1 \\ -w^2 & -2\gamma \end{bmatrix} \begin{bmatrix} d_1 \\ d_2 \end{bmatrix} + B_{dd} \begin{bmatrix} T_{sp} \\ T_{oa} \end{bmatrix}; \quad \text{(Eq. T)}$$

where w is a frequency tuning parameter, y is a damping tuning parameter, $B_{dd}$ is a matrix mapping a forcing input, $T_{sp}$ is an indoor air temperature setpoint, and $T_{oa}$ is an outdoor air temperature. For example, the values of w and y can be selected to provide a user-selected period or frequency for the oscillator system, for example a period of one day that reflects oscillations in solar irradiance as described above. As such, the tuning parameters can be set to $$w = \frac{2\pi}{24 \times 3600}, \gamma = 0,$$

and the matrix that maps the forcing input $B_{dd}$ can be set to zeroes $$\left(\text{i.e., } B_{dd} = \begin{bmatrix} 0 & 0 \\ 0 & 0 \end{bmatrix}\right).$$

In this example, a pure oscillator system with zero damping and a frequency corresponding to a one-day period is achieved.

In some embodiments, the disturbance model is determined via a system identification using the training data received in step 1902. Similar to using the known higher order disturbance model, two disturbance states, $d_1$ and $d_2$, represent values of heat disturbance and a rate of change in the values of the heat disturbance respectively. In general, the disturbance model determined via system identification has the following form:

$$\begin{bmatrix} \dot{d}_1(t) \\ \dot{d}_2(t) \end{bmatrix} = A_d \begin{bmatrix} d_1(t) \\ d_2(t) \end{bmatrix} + B_{dd}u(t) + \begin{bmatrix} \theta_1 & \theta_2 \\ \theta_3 & \theta_4 \end{bmatrix} \begin{bmatrix} d_1(t) \\ d_2(t) \end{bmatrix} + \begin{bmatrix} \theta_5 & \theta_6 \\ \theta_7 & \theta_8 \end{bmatrix} \begin{bmatrix} T_{sp} \\ T_{oa} \end{bmatrix}; \quad \text{(Eq. U)}$$

or compactly as:

$$\begin{bmatrix} \dot{d}_1 \\ \dot{d}_2 \end{bmatrix} = A_d \begin{bmatrix} d_1 \\ d_2 \end{bmatrix} + B_{dd}u = \begin{bmatrix} \theta_1 & \theta_2 \\ \theta_3 & \theta_4 \end{bmatrix} \begin{bmatrix} d_1(t) \\ d_2(t) \end{bmatrix} + \begin{bmatrix} \theta_5 & \theta_6 \\ \theta_7 & \theta_8 \end{bmatrix} \begin{bmatrix} T_{sp} \\ T_{oa} \end{bmatrix}; \quad \text{(Eq. U)}$$

where $\theta_1$ through $\theta_8$ are parameters that can be identified or set to a prospected value, and all other variables being the same as above. During step 1908, a Kalman gain for the augmented system is determined (or identified). The Kalman gain and the augmented system matrices can be used together to estimate historical heat disturbance values. In some embodiments, step 1908 is performed by controller 212.

Process 1900 is shown to include estimating historical heat disturbances using the disturbance model and the training data (step 1910), according to some embodiments. To estimate the historical heat disturbance, the disturbance model including the augmented system matrices as well as the Kalman gain can use the training data as input. In general, accuracy of the estimated historical heat disturbance hinges on accuracy of the system identification in step 1904 and parameters of the disturbance model identified/selected in step 1908. Accordingly, one result of process 1900 is a set of estimated historical heat disturbance values that includes a heat disturbance value for a plurality of time steps for which training data is available. In some embodiments, step 1910 is performed by controller 212.

Referring now to FIG. 20, a process 2000 for predicting a forecasted heat disturbance $\hat{Q}_{other_{forecast}}$ and performing model predictive control based on the forecasted heat disturbance is shown, according to some embodiments. Process 2000 uses an autoregressive (AR) model to model a stochastic heat disturbance. In some embodiments, the AR model is used online (i.e., while the system is operating) to correct predictions of a deterministic heat disturbance by accounting for residuals (i.e., prediction errors), thereby predicting the stochastic heat disturbance of $Q_{other}$. In some embodiments, some and/or all steps of process 2000 are performed by controller 212.

Process 2000 is shown to include estimating historical heat disturbance (step 2002), according to some embodiments. In some embodiments, step 2002 is accomplished by performing process 1900 described with reference to FIG. 19. Process 2000 may require the system matrices, the disturbance model, the Kalman gain, and the estimated historic heat disturbance as determined in process 1900 to estimate $\hat{Q}_{other_{forecast}}$. In some embodiments, step 2002 is performed by controller 212.

Process 2000 is shown to include receiving an augmented system model, a disturbance model, and estimated historical heat disturbances (step 2004), according to some embodiments. In general, the disturbance model and the estimated historical heat disturbances are as determined in step 2002. In some embodiments, step 2004 is performed by controller 212.

Process 2000 is shown to include training a deterministic heat disturbance model for online predictions of the deterministic portion of heat disturbances (step 2005), according to some embodiments. In some embodiments, the deterministic heat disturbance model uses a linear regression and data fitting and/or pattern recognition to estimate the deterministic heat disturbance value similar to and/or the same as a deterministic load as described in U.S. patent application Ser. No. 14/717,593 filed May 20, 2015, incorporated by reference herein in its entirety. The disturbance model can be trained using the training data of process 1900 and the estimated historical heat disturbance so that the disturbance model can properly estimate deterministic heat disturbance values based on environmental conditions, a time of day, a day of the week, etc. In some embodiments, step 2005 is performed by controller 212.

Process 2000 is shown to include training an autoregressive (AR) model to predict residuals of the disturbance model (step 2006), according to some embodiments. In some embodiments, the AR model is trained using the estimated historical heat disturbances gathered in step 2002. In some embodiments, the AR model is a first order model that captures the stochastic part of the heat disturbance $Q_{other}$. In some embodiments, the AR model is a higher order model. The AR model can be determined off-line and may not be part of a state space model used during a model predictive control process. In general, a first order AR model can have the following form:

$$\hat{e}(k+1) = a_1 e(k) \quad \text{(Eq. V);}$$

where $$e(k) = Q_{other_{measured}}(k) - \hat{Q}_{other_{deterministic}}(k)$$

where k is a time step, $\hat{e}(k+1)$ is a residual for a next time step, $a_1$ is a constant, $Q_{other_{measured}}(k)$ is measurement of the heat disturbance for time step k, and $\hat{Q}_{other_{deterministic}}(k)$ is the deterministic heat disturbance for time step k. As $Q_{other_{measured}}(k)$ cannot be directly obtained, $Q_{other_{measured}}(k) = d_1(k)$ as estimated in Eq. P and Eq. R. As a result, a residual can be determined for a current time step and estimated for future time steps by the AR model. In some embodiments, the AR model trained to predict residuals is similar to and/or the same as an autoregressive model to predict residuals as described in U.S. patent application Ser. No. 14/717,593, filed Nov. 5, 2015, incorporated by reference herein in its entirety. In some embodiments, step 2006 is performed by controller 212.

Process 2000 is shown to include collecting current environmental data (step 2008), according to some embodiments. The current environmental data can include, for example, temperature measurements, humidity measurements, external weather conditions, air quality, etc. The current environmental data can be collected by various sensors in a building, a weather service, and/or any device/system capable of collecting and communicating environmental data to controller 212. For example, temperature sensor 214 and temperature sensor 216 may collect and communicate an indoor air temperature and an outdoor air temperature to controller 212 respectively. The current environmental data may also include information that can result in a heat disturbance such as, for example, occupancy in a building, current electrical consumption, time of day, etc. In some embodiments, step 2008 is performed by controller 212 and various devices/services capable of collecting and communicating environmental data (e.g., temperature sensor 214).

Process 2000 is shown to include performing an online state estimation using the system matrices and the current environmental data (step 2010), according to some embodiments. In step 2010, the five state model described in Eq. P and Eq. R can be converted to discrete time. Further, a state estimation can be conducted using the Kalman gain identified for the model. For each time step k, a state vector of the following form can be calculated:

$$\begin{bmatrix} T_{ia}(k) \\ T_m(k) \\ I \\ d_1(k) \\ d_2(k) \end{bmatrix}$$

where all variables are the same as described in Eq. P and Eq. R for each time step k. In some embodiments, step 2010 is performed by controller 212.

Process 2000 is shown to include estimating a deterministic heat disturbance value for a current time step using the disturbance model and the current environmental data (step 2012), according to some embodiments. Specifically, the current environmental data can be applied to the disturbance model to obtain the estimation of the deterministic heat disturbance value. In some embodiments, step 2012 is performed by controller 212.

Process 2000 is shown to include calculating a current residual based on the online state estimation and the estimated deterministic heat disturbance for the current time step (step 2014), according to some embodiments. In general, the current residual can be calculated by the following equation:

$$e(k) = d_1(k) - \hat{Q}_{other_{deterministic}}(k) \quad \text{(Eq. W);}$$

where e(k) is the current residual, $d_1(k)$ is a value of heat disturbance for the current time step determined based on the online state estimation performed in step 2010, and $\hat{Q}_{other_{deterministic}}(k)$ is the deterministic heat disturbance estimated in step 2012. The current residual can illustrate the inaccuracy of $\hat{Q}_{other_{deterministic}}(k)$ due to the stochastic heat disturbance. In general, a large value (negative or positive) of the current residual indicates $\hat{Q}_{other_{deterministic}}(k)$ is inaccurate while values of the current residual close to 0 indicate $\hat{Q}_{other_{deterministic}}(k)$ is more accurate. If the current residual is equal to 0, the stochastic heat disturbance may have no effect on heat disturbance. In some embodiments, step 2014 is performed by controller 212.

Process 2000 is shown to include predicting a stochastic heat disturbance for subsequent time steps using the autoregressive (AR) model and the current residual (step 2016), according to some embodiments. As the current residual can indicate a stochastic heat disturbance for a current time step, the current residual can be used as input to the AR model for predicting the stochastic heat disturbance for the subsequent time steps (i.e., the model trained at step 2006). Based on a magnitude of the stochastic heat disturbance, the AR model can determine an accuracy of the estimated deterministic heat disturbance for the current time step. As the magnitude of the stochastic heat disturbance grows, additional correction may be necessary by the AR model to predict an accurate stochastic heat disturbance for the subsequent time steps. In some embodiments, the stochastic heat disturbance for a next time step is described as $\hat{Q}_{other_{stochastic}}(k+1)$ where k+1 is the next time step (i.e., the time step after time step k). Similarly, the stochastic heat disturbance for any subsequent time steps can be described as $\hat{Q}_{other_{stochastic}}(k+n)$ for some $n^{th}$ subsequent time step. In some embodiments, step 2016 is performed by controller 212.

Process 2000 is shown to include predicting a deterministic heat disturbance for the subsequent time steps using the disturbance model and the current environmental data (step 2018), according to some embodiments. The disturbance model can be configured to estimate future deterministic heat disturbances based on current data. As such, the current environmental data can be used as input to the disturbance model such that the disturbance model can output the predicted deterministic heat disturbance for the subsequent time steps. When predicting the deterministic heat disturbance for the subsequent time steps, the disturbance model may not use the stochastic heat disturbance for the subsequent time steps predicted in step 2016. As such, step 2018 may be similar to step 2012 for the subsequent time steps.

In general, the deterministic heat disturbance for a next time step is described as $\hat{Q}_{other_{deterministic}}(k+1)$ where k+1 is the next time step. Similarly, the deterministic heat disturbance for any subsequent time step can be described as $\hat{Q}_{other_{deterministic}}(k+n)$ for some $n^{th}$ subsequent time step. In some embodiments, step 2018 is performed by controller 212.

Process 2000 is shown to include predicting a forecasted heat disturbance for the subsequent time steps as a sum of the deterministic heat disturbance and the stochastic heat disturbance (step 2020), according to some embodiments. The forecasted heat disturbance $\hat{Q}_{other_{forecast}}(k+1)$ is an estimated value of total heat disturbance for the next time step k+1. In general, $\hat{Q}_{other_{forecast}}(k+1)$ can be predicted by the following equation:

$$\hat{Q}_{other_{forecast}}(k+1) = \hat{Q}_{other_{deterministic}}(k+1) + \hat{Q}_{other_{stochastic}}(k+1) \quad \text{(Eq. X)};$$

or as:

$$\hat{Q}_{other_{forecast}}(k+1) = \hat{Q}_{other_{deterministic}}(k+1) + \hat{e}(k+1) \quad \text{(Eq. Y)};$$

where all variables are as defined above. If $\hat{Q}_{other_{deterministic}}(k+1)$ is a positive value, the predicted heat disturbance for the next time step may be adding additional heat into a space (e.g., building 10). If $\hat{Q}_{other_{forecast}}(k+1)$ is a negative value, the predicted heat disturbance for the next time step may be taking heat out of the space. $\hat{Q}_{other_{forecast}}$ can similarly be determined for other subsequent time steps based on $\hat{Q}_{other_{deterministic}}$ and $\hat{Q}_{other_{stochastic}}$ for each subsequent time step. In some embodiments, step 2020 is performed by controller 212.

Process 2000 is shown to include performing a model predictive control process to control building equipment using the forecasted heat disturbance and the identified model (step 2022), according to some embodiments. By taking into account the forecasted heat disturbance, the model predictive control process can further optimize (e.g., reduce) costs related to operation of building equipment. For example, if the forecasted heat disturbance is positive and a building zone requires heating to maintain occupant comfort, the model predictive control process may determine that a heater is not required to be operated as the heat disturbance will increase a temperature of the building zone regardless. Without accounting for the forecasted heat disturbance, the model predictive control process may otherwise make control decisions that do not maintain occupant comfort and/or do not optimize costs. In some embodiments, step 2022 is performed by controller 212.

Referring now to FIG. 21, a process 2100 for determining a deterministic heat disturbance and performing a model predictive control process based on the deterministic heat disturbance is shown, according to some embodiments. Process 2100 utilizes multistep system identification to determine a Kalman gain and a stochastic disturbance model that is part of a state space system. In process 2100, the heat disturbance predictions from the deterministic heat disturbance model can be used as input for determining overall heat disturbance. Further, the Kalman gain and the stochastic disturbance model can be identified to account for inaccuracy in prediction of the deterministic heat disturbance due to inherent randomness, thereby allowing a stochastic heat disturbance to be calculated. In some embodiments, some and/or all steps of process 2000 are performed by controller 212.

Process 2100 is shown to include estimating historical heat disturbance (step 2102), according to some embodiments. In some embodiments, step 2102 is accomplished by performing process 1900 described with reference to FIG. 19. In some embodiments, step 2102 is performed by controller 212.

Process 2100 is shown to include training a deterministic heat disturbance model for online predictions of the deterministic portion of heat disturbances (step 2104), according to some embodiments. In some embodiments, the deterministic heat disturbance model uses a linear regression and data fitting and/or pattern recognition to estimate the deterministic heat disturbance value similar to and/or the same as a deterministic load as described in U.S. patent application Ser. No. 14/717,593 filed May 20, 2015, incorporated by reference herein in its entirety. The disturbance model can be trained using the training data of process 1900 and the estimated historical heat disturbance so that the disturbance model can properly estimate deterministic heat disturbance values based on environmental conditions. In some embodiments, step 2104 is performed by controller 212.

Process 2100 is shown to include receiving a system model and augmenting the system model with a stochastic state space model and a Kalman gain (step 2106), according to some embodiments. Specifically, the stochastic state space model used to augment the system model can be a new disturbance model $A_{d_e}$ that captures the stochastic piece of the heat disturbance. In general, the augmented system model can have the following form:

$$\begin{bmatrix} \dot{T}_{ia} \\ \dot{T}_m \\ \dot{I} \\ \dot{d}_e \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} & \frac{1}{C_{ia}} \\ \frac{1}{C_m R_{mi}} & -\frac{1}{C_m R_{mi}} & 0 & 0 \\ -1 & 0 & 0 & 0 \\ 0 & 0 & 0 & A_{d_e} \end{bmatrix} \quad \text{(Eq. Z)}$$

$$\begin{bmatrix} T_{ia} \\ T_m \\ I \\ d_e \end{bmatrix} + \begin{bmatrix} \frac{K_p}{C_{ia}} & \frac{1}{C_{ia}R_{oi}} & \frac{1}{C_{ia}} \\ 0 & 0 & 0 \\ 1 & 0 & 0 \\ 0 & 0 & 0 \end{bmatrix} \begin{bmatrix} T_{sp} \\ T_{oa} \\ \hat{Q}_{other_{deterministic}} \end{bmatrix};$$

$$\begin{bmatrix} T_{ia} \\ \dot{Q}_{HVAC} \end{bmatrix} = \begin{bmatrix} 1 & 0 & 0 & 0 \\ -K_p & 0 & K_I & 0 \end{bmatrix} \quad \text{(Eq. AA)}$$

$$\begin{bmatrix} T_{ia} \\ T_m \\ I \\ d_e \end{bmatrix} + \begin{bmatrix} 0 & 0 & 0 \\ K_p & 0 & 0 \end{bmatrix} \begin{bmatrix} T_{sp} \\ T_{oa} \\ \hat{Q}_{other_{deterministic}} \end{bmatrix};$$

where $A_{d_e}$ is the new disturbance model, $d_e$ is a disturbance state that captures the stochastic heat disturbance, $\hat{Q}_{other_{deterministic}}$ is the deterministic heat disturbance, and all other variables are as defined above. For the augmented system model to be usable, values for the Kalman gain and $A_{d_e}$ must be identified as described in greater detail below in step 2108. In some embodiments, the disturbance states at each time step $d_e(k)$ only capture the stochastic heat disturbance as the deterministic heat disturbance is already accounted for. In some embodiments, the above four state model is used for both online estimations and online model predictive control (MPC) predictions. Further, the state space system above can be converted to a discrete time model to estimate heat disturbance at particular points in time over a time horizon. In some embodiments, step 2106 is performed by controller 212.

Process 2100 is shown to include determining an identified model by performing a system identification to determine values of the Kalman gain and stochastic disturbance model parameter(s) based on the historical heat disturbances and the training data (step 2108), according to some embodiments. Based on the historical heat disturbances, the Kalman gain can be determined such that the Kalman gain accounts for previous heat disturbances during previous time steps. By accounting for the historical heat disturbances, the Kalman gain (i.e., an adjustment for how inaccurate the deterministic heat disturbance is due to the stochastic heat disturbance) can be more precisely estimated to account for actual dynamics of the system. In step 2108, values of $A_{d_e}$ (i.e., values of the stochastic disturbance model parameter(s)) can also be determined as part of the performed system identification. In some embodiments, multi-step ahead prediction is utilized in identification of $A_{d_e}$ and the Kalman gain for improved estimation of the stochastic heat disturbance. In some embodiments, step 2108 is performed by controller 212.

Process 2100 is shown to include collecting an environmental condition forecast and/or a weather forecast (step 2110), according to some embodiments. The environmental condition forecast can include current and/or predicted environmental conditions for future times. The environmental condition forecast can include, for example, current/predicted temperature measurements, current/predicted humidity measurements, current/predicted external weather conditions, current/predicted air quality, etc. The environmental condition forecast can be collected by various sensors in a building, a weather service, and/or any device/system capable of collecting and communicating environmental data to controller 212. For example, temperature sensor 214 and temperature sensor 216 may collect and communicate an indoor air temperature and an outdoor air temperature to controller 212 respectively. The environmental condition forecast may also include information regarding factors that can result in a heat disturbance such as, for example, occupancy in a building, current electrical consumption, time of day, etc. The weather forecast collected in step 2110 can include predictions of external weather conditions at future times. The weather forecast can be obtained by, for example, requesting the weather forecast from an application programming interfaces (APIs) that provides weather forecasts to requesting services. The weather forecast can be utilized for estimating heat disturbances due to external conditions. In some embodiments, the environmental condition forecast and the weather forecast are part of a single forecast. In some embodiments, step 2110 is performed by controller 212 and various devices/services capable of collecting and communicating environmental data (e.g., temperature sensor 214).

Process 2100 is shown to include predicting deterministic heat disturbances using the disturbance model along with the environmental condition forecast and/or the weather forecast (step 2112), according to some embodiments. The deterministic heat disturbances may need to be estimated as the deterministic heat disturbance is used as input to the disturbance model for predicting the stochastic heat disturbances. In some embodiments, step 2112 is similar to and/or the same as step 2012 described with reference to FIG. 20. In general, the disturbance model can utilize the environmental condition forecast and/or the weather forecast as input and output a deterministic heat disturbance prediction. In some embodiments, the disturbance model utilizes the entirety of the environmental condition forecast and/or the weather forecast as input. In some embodiments, the disturbance model utilizes a portion of the environmental condition forecast and/or the weather forecast as input. In some embodiments, step 2112 is performed by controller 212.

Process 2100 is shown to include performing a model predictive control process to control building equipment using the deterministic heat disturbance predictions and the identified model (step 2114), according to some embodiments. Based on results of step 2112, the deterministic heat disturbance predictions can be used as input to the identified model to predict the stochastic heat disturbances. The deterministic heat disturbance predictions and the stochastic heat disturbance predictions can be used to determine a total heat disturbance to be considered during the model predictive control process. By taking into account the total heat disturbance, the model predictive control process can further optimize (e.g., reduce) costs related to operation of building equipment operable to heat or cool a building. For example, if the total heat disturbance is positive and a building zone requires heating to maintain occupant comfort, the model predictive control process may determine that a heater is not required to be operated as the heat disturbance will increase a temperature of the building zone regardless. Without accounting for the total heat disturbance, the model predictive control process may otherwise make control decisions that do not maintain occupant comfort and/or do not optimize costs. In some embodiments, step 2114 is performed by controller 212.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. An environmental control system for a building, the system comprising:
    building equipment operable to affect a variable state or condition of the building; and
    a controller comprising a processing circuit configured to:
        identify values for unknown parameters of a non-integrating disturbance model;
        estimate historical values of a heat disturbance using a system model augmented with the non-integrating disturbance model;
        predict a future value of the heat disturbance using one or more heat disturbance models, wherein the one or more heat disturbance models are trained on estimated historical values of the heat disturbance; and
        control the building equipment based on the predicted future value of the heat disturbance.

2. The system of claim 1, wherein the processing circuit is further configured to train the one or more heat disturbance models by:
    training a deterministic heat disturbance model using the estimated historical values of the heat disturbance; and
    training a stochastic heat disturbance model using the estimated historical values of the heat disturbance and the deterministic heat disturbance model;
    wherein the one or more heat disturbance models comprise the deterministic heat disturbance model and the stochastic heat disturbance model.

3. The system of claim 1, wherein the non-integrating disturbance model is an oscillator function with a frequency of one day.

4. The system of claim 1, wherein predicting the future value of the heat disturbance comprises:
    estimating a deterministic heat disturbance for a future time step;
    predicting a stochastic heat disturbance for the future time step; and
    predicting the future value of the heat disturbance for the future time step based on the stochastic heat disturbance for the future time step and the deterministic heat disturbance for the future time step.

5. The system of claim 4, wherein predicting the stochastic heat disturbance for the future time step comprises:
    performing an online state estimation;
    calculating a current residual based on the online state estimation and an estimated deterministic heat disturbance for a current time step; and
    predicting the stochastic heat disturbance for the future time step based on a trained autoregressive model and the current residual.

6. The system of claim 1, wherein predicting the future value of the heat disturbance comprises:
    applying one or more Kalman gain parameters to a second system model;

performing a system identification process to determine values of the second system model and the one or more Kalman gain parameters; and estimating a current stochastic heat disturbance based on the second system model with the one or more Kalman gain parameters and one or more current environmental conditions.

7. A method for operating building equipment in a building, the method comprising:

identifying values for unknown parameters of a non-integrating disturbance model:

estimating historical values of a heat disturbance using a system model augmented with the non-integrating disturbance model;

training one or more heat disturbance models on the estimated historical values of the heat disturbance affecting the building;

predicting a future value of the heat disturbance using the one or more heat disturbance models; and controlling the building equipment using the predicted future value of the heat disturbance.

8. The method of claim 7, wherein the non-integrating disturbance model is a second order model.

9. The method of claim 7, wherein the non-integrating disturbance model is an oscillator function.

10. The method of claim 7, wherein predicting the future value of the heat disturbance comprises:

estimating a deterministic heat disturbance for a future time step;

predicting a stochastic heat disturbance for the future time step; and predicting the future value of the heat disturbance for the future time step based on the stochastic heat disturbance for the future time step and the deterministic heat disturbance for the future time step.

11. The method of claim 10, wherein predicting the stochastic heat disturbance for the future time step comprises:

performing an online state estimation;

calculating a current residual based on the online state estimation and an estimated deterministic heat disturbance for a current time step; and predicting the stochastic heat disturbance for the future time step based on a trained autoregressive model and the current residual.

12. The method of claim 7, wherein predicting the future value of the heat disturbance comprises estimating a current stochastic heat disturbance based on a second augmented system model and one or more current environmental conditions.

13. One or more non-transitory computer-readable media containing program instructions that, when executed by one or more processors, cause the one or more processors to perform operations comprising:

obtaining estimated historical values of a heat disturbance using a second-order oscillating disturbance model;

training one or more heat disturbance models based on the estimated historical values of the heat disturbance affecting a building;

predicting a future value of the heat disturbance using the one or more heat disturbance models; and controlling building equipment based on the predicted future value of the heat disturbance.

14. The non-transitory computer-readable media of claim 13, wherein the second-order oscillating disturbance model has known parameters.

15. The non-transitory computer-readable media of claim 13, wherein the second-order oscillating disturbance model has a frequency of one day.

16. The non-transitory computer-readable media of claim 13, wherein predicting the future value of the heat disturbance comprises:

estimating a deterministic heat disturbance for a future time step;

predicting a stochastic heat disturbance for the future time step; and predicting a forecasted heat disturbance for one or more subsequent time steps based on the stochastic heat disturbance for the future time step and the deterministic heat disturbance for the future time step.

17. The non-transitory computer-readable media of claim 13, wherein predicting the future value of the heat disturbance comprises:

applying one or more Kalman gain parameters to an augmented system model;

performing a system identification process to determine values of the one or more Kalman gain parameters; and estimating a current stochastic heat disturbance based on the augmented system model with the one or more Kalman gain parameters and one or more current environmental conditions.

18. The system of claim 1, wherein the processing circuit is further configured to:

obtain training data relating to operation of the building equipment at a plurality of historical time steps; and perform a system identification process to identify parameters of the system model using the training data.

19. The method of claim 7, wherein estimating the historical values of the heat disturbance affecting the building is based on a set of training data for a plurality of historical time steps, the set of training data consisting of data other than the historical values of the heat disturbance.

20. The method of claim 7, wherein the estimated historical values are obtained using a first augmented system model and controlling the building equipment using the predicted future value of the heat disturbance comprises using a second augmented system model different than the first augmented system model.

21. The non-transitory computer-readable media of claim 13, wherein obtaining the historical values of the heat disturbance affecting the building for a plurality of historical time steps is based on a set of training data for the plurality of historical time steps, the set of training data consisting of data other than the historical values of the heat disturbance.

22. The non-transitory computer-readable media of claim 13, wherein the operations further comprise:

performing a system identification process to identify parameters of a system model for the building;

augmenting the system model with the second-order oscillating disturbance model; and estimating the historical values of the heat disturbance using the augmented system model.

* * * * *